(12) United States Patent
Tiwari et al.

(10) Patent No.: US 11,363,437 B2
(45) Date of Patent: Jun. 14, 2022

(54) PATRON SERVICE METHOD UTILIZING NEAR-FIELD COMMUNICATION TAG IDENTIFIERS

(71) Applicants: Rajesh Tiwari, San Ramon, CA (US); Archana Deshpande, San Ramon, CA (US); Archit Peshave, Pune (IN)

(72) Inventors: Rajesh Tiwari, San Ramon, CA (US); Archana Deshpande, San Ramon, CA (US); Archit Peshave, Pune (IN)

(73) Assignees: Rajesh Tiwari, San Ramon, CA (US); Archana Deshpane, San Ramon, CA (US); Archit Peshave, Pune (IN); Quickze Inc, San Ramon, CA (US)

( * ) Notice: Subject to any disclaimer, the term of this patent is extended or adjusted under 35 U.S.C. 154(b) by 0 days.

(21) Appl. No.: 16/882,310

(22) Filed: May 22, 2020

(65) Prior Publication Data

US 2021/0368316 A1 Nov. 25, 2021

(51) Int. Cl.
| | |
|---|---|
| *H04B 7/00* | (2006.01) |
| *H04W 4/80* | (2018.01) |
| *H04W 4/021* | (2018.01) |
| *H04W 4/33* | (2018.01) |
| *G06F 3/0482* | (2013.01) |
| *H04W 8/26* | (2009.01) |
| *G06Q 20/20* | (2012.01) |
| *G06Q 50/12* | (2012.01) |
| *H04W 12/06* | (2021.01) |
| *G06F 3/04817* | (2022.01) |

(52) U.S. Cl.
CPC ............ *H04W 4/80* (2018.02); *G06F 3/0482* (2013.01); *G06F 3/04817* (2013.01); *G06Q 20/20* (2013.01); *G06Q 50/12* (2013.01); *H04W 4/021* (2013.01); *H04W 4/33* (2018.02); *H04W 8/26* (2013.01); *H04W 12/06* (2013.01)

(58) Field of Classification Search
CPC ......... H04W 4/80; H04W 4/33; H04W 4/021; H04W 12/06; H04W 8/26; G06F 3/04817; G06F 3/0482; G06Q 20/20; G06Q 50/12
USPC ....................................................... 455/41.1
See application file for complete search history.

(56) References Cited

U.S. PATENT DOCUMENTS

| | | | | |
|---|---|---|---|---|
| 10,510,074 | B1* | 12/2019 | Rule | G06Q 20/3829 |
| 10,511,443 | B1* | 12/2019 | Newman | H04L 9/0897 |
| 2012/0185306 | A1* | 7/2012 | Cheng | G06Q 20/209 |
| | | | | 703/24 |
| 2013/0247117 | A1* | 9/2013 | Yamada | H04W 4/029 |
| | | | | 340/12.5 |

(Continued)

*Primary Examiner* — April G Gonzales
(74) *Attorney, Agent, or Firm* — Bay Area LLP

(57) ABSTRACT

A near-field communication ("NFC") tag identifier (ID) associated with an establishment obtain by scanning an NFC tag at a location in the establishment using a wireless device of a patron is received. Login credentials associated with the patron and the wireless device are received. A location of the patron in the establishment is determined from the login credentials associated with the patron and the wireless device, and from the NFC tag ID. An available service of the establishment is communicated to the wireless device of the patron based on the login credentials associated with the patron and the wireless device, and from the NFC tag ID. The identified location is associated with exact order items so the service staff is able to keep track of an order made by the patron.

18 Claims, 16 Drawing Sheets

(56) References Cited

U.S. PATENT DOCUMENTS

| | | | | |
|---|---|---|---|---|
| 2013/0303085 A1* | 11/2013 | Boucher | ............... | H04W 4/80 |
| | | | | 455/41.1 |
| 2015/0100499 A1* | 4/2015 | Dua | ............... | G06Q 20/32 |
| | | | | 705/76 |
| 2015/0142483 A1* | 5/2015 | Bergdale | ............... | G06Q 10/02 |
| | | | | 705/5 |
| 2015/0244421 A1* | 8/2015 | Nambord | ............... | H04B 5/0031 |
| | | | | 455/41.1 |
| 2015/0245384 A1* | 8/2015 | Nambord | ............... | H04B 5/0037 |
| | | | | 455/41.1 |
| 2015/0245385 A1* | 8/2015 | Nambord | ............... | H04B 5/0081 |
| | | | | 455/41.1 |
| 2015/0302413 A1* | 10/2015 | Dua | ............... | G06Q 20/40145 |
| | | | | 705/44 |
| 2015/0339667 A1* | 11/2015 | Dua | ............... | G06Q 20/327 |
| | | | | 705/16 |
| 2021/0368316 A1* | 11/2021 | Tiwari | ............... | H04W 12/47 |

* cited by examiner

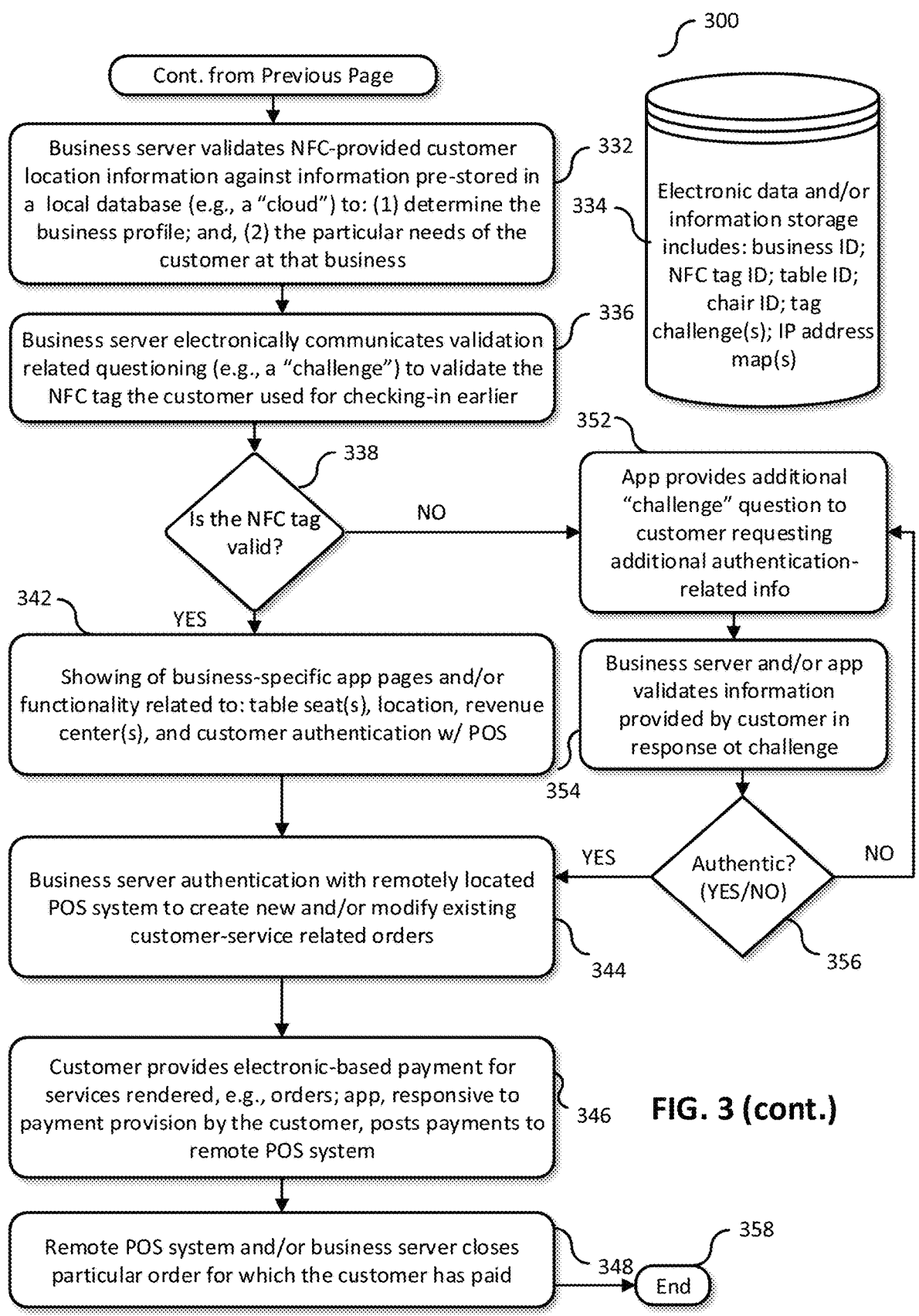

PATRON SERVICE METHOD UTILIZING NEAR-FIELD COMMUNICATION TAG IDENTIFIERS

CROSS-REFERENCE TO RELATED APPLICATIONS

Not applicable.

RELATED CO-PENDING U.S. PATENT APPLICATIONS

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

The disclosed embodiments generally relate to a system and method of use thereof for enhancing and/or streamlining provision of customer service; more particularly, a computer-based application (e.g., an "application") is disclosed, suitable for installation in a smart device, the application securely identifying and validating a location and particular service needs of a customer in a business establishment, e.g., a restaurant, to provide for more attentive and/or responsive service to the customer than otherwise achievable via traditional means.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Rapidly transitioning consumer preferences, in view of advances in modern communications and smartphone-based wireless technologies, have left many traditional brick-and-mortar retail business establishments, such as restaurants, in a precarious position regarding how to best meet such changing needs. Already prone to tremendous cost competition and fickle consumer tastes, the restaurant business may especially be ready for through-put enhancements made possible through the strategic implementation of technology. Currently, the vast majority of restaurants greet customers by providing a face-to-face interaction with a host or a hostess, later supplemented with the arrival of a waiter or waitress to a table or bar location to manually request and record customer food and drink orders.

Moreover, certain restaurants may not even have capabilities directed toward recording customer reservations to allow for regular through-put, contributing to untenable lines and potential lost business. In an industry where reliable through-put defines whether a restaurant closes, merely survives, or thrives, having the ability to accurately predict customer traffic and reduce lost down-time associated with human wait staff efficiency may be critical. Doing so effectively mitigates the constant and real danger of under or over-utilization, resulting in a potentially business-ending mis-match between customer demands and restaurant service capacity and capability. Such concerns need not only be limited to the restaurant business alone, given that other hospitality industry outlets such as hotels, casinos and resorts, and even non-hospitality industry entities such as hospitals and clinics, may equally benefit from the implementation of smartphone-based wireless technology to alleviate work-flow related irregularity and inefficiency.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. An interactive system, which allows customers to electronically place and pay for menu orders by themselves at food service establishments and which processes said orders may be known. The invention comprises an ordering device, which contains a data input mechanism, display, and wireless communication mechanism. A server may be provided for processing menu orders and payments. Means may be provided for adding menu items to a menu order by selecting from a textual and/or graphical list or by entering a corresponding code. Means may also be provided for transmitting said order to food service establishment, as are for accepting payment using cashless payment mediums.

Also, smart-device based systems operable on a handheld electronic device for handling restaurant transactions may be known. Applications allow a customer to reserve a table at a restaurant, order his or her food before going to the reserved table, and pay the bill at the touch of a button using his or her mobile phone or device. The application may also provide delivery service for food orders from restaurants/ cafes and many associated functions. The system may include and/or require plastic cards with a radio frequency identification device (RFID) for each user. An RFID reader is mounted at the door of the restaurants, such that a user can automatically pay their bills upon exiting a restaurant.

By way of educational background, another aspect of the prior art generally useful to be aware of is that online ordering, reservation and catering platforms may be known, such platforms relying upon advanced software system architecture to offer many types of online services. Solutions directed toward the restaurant industry provide business owners and Internet users with sets of options to deliver and respond to online requests automatically and instantly through various means of real time interactive communications.

The above systems and methods generally integrate technological means to identify, track, and permit customers to communicate with service provider wait staff without having to actually (e.g., physically) motion for assistance to progress in, for example, the dining process. Yet shortcomings associated with inefficiencies prevalent in the implementation of such technologies persist, as do lag and/or responsiveness related limitations most commonly associated with the aforementioned data transfer techniques, e.g., the Internet. Moreover, one can expect the integration of bulky pieces of equipment, such as many radio-frequency identification ("RFID") tags, to be undesirable in most retail business establishment, e.g., restaurant, settings. Likewise, the complexities of a comprehensive online ordering process may be excessive for the targeted needs of a dining patron, seeking primarily to eat, drink, enjoy the experience and leave within a reasonable time frame. And, implementing complex geo-location solutions in smaller retail restaurant environments may prove challenging and not cost-efficient.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
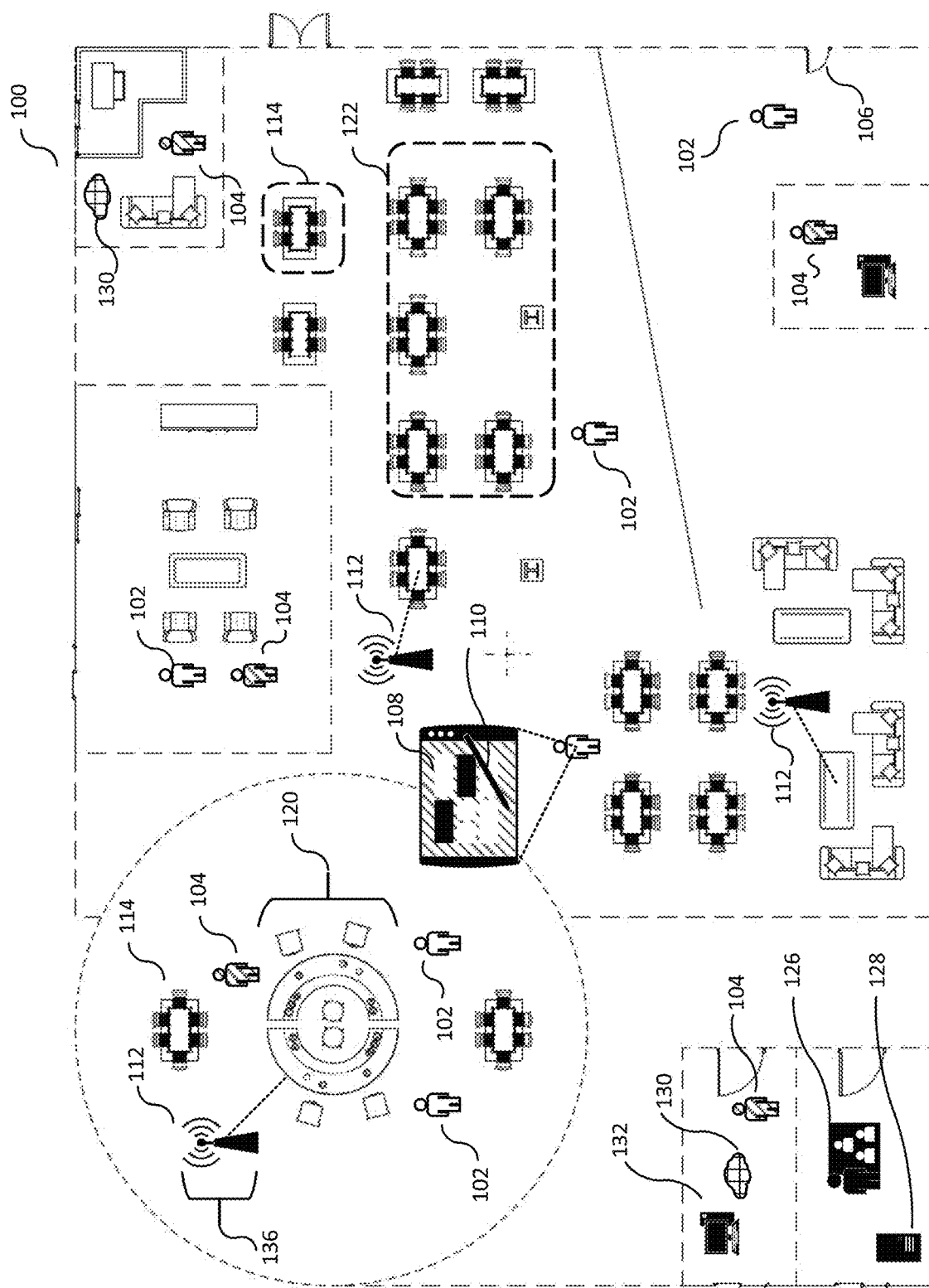
FIG. 1 illustrates an exemplary schematic diagram of a retail business establishment, e.g., a restaurant, equipped with near-field communication ("NFC") tags and corresponding wireless powering and/or detection capabilities for customer location identification and for intaking customer reservation and food and/or drink requests, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. Application. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. Application. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. Application. 04-1116, 2004 U.S. Application. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. Application. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like.

It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . .", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the disclosed and claimed subject matter may include the use of either of the other two terms.

Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Introduction

Embodiments of the invention disclosed herein relate to a system and method of use thereof for improving service provider efficiency in providing service responsive to the request of a customer through implementation of smartphone (or device) based wireless technology. More particularly, some embodiments of the invention relate to securely identifying and validating a customer's location and customer's service demands based at least partially on communications established between the smartphone (or device) and a near-field communication ("NFC") tag affixed to, for example (without limitation thereto) a table surface at a restaurant, allowing the restaurant wait staff to more efficiently provide service to the customer without wasting unnecessary wasteful repeat trips, etc. Customer identification, validation and/or verification may be performed by, for example (but without limitation thereto), recognizing individual customers at least partially based on the respective internet protocol ("IP") addresses of their smartphones or devices to filter out invalid (e.g., "bad") requests. Implementation of NFC-based technology, combined with unique authentication offered via the IP address validation as so described, permits for rapid and responsive service provision to meet or exceed the demands of customers in an efficient, secure and reliable manner. (Customer exact location is identified using the login id, unique NFC device id, specific information encoded on the NFC tag (including restaurant/any establishment's id, revenue center, table number, chair id, hospital room, pool side chair location etc. This information is encoded on a NFC tag using business specific mobile application provided as part of the solution.)

One or more embodiments disclosed herein are directed to a system and a method of use and/or implementation thereof for securely identifying and validating at least a customer's location and customer's service needs within, for example (but without limitation thereto): a hospitality business using a combination of technology-based customer location identifiers and applications, e.g., installable both at the customer (e.g. client) side and the business (e.g., server) side. One or more embodiments disclosed herein relate to a computer-based application that is downloadable from the Internet (e.g., as made available via a cloud-based virtual location) installable in a personal/mobile portable electronic device and/or a peripheral, such as a wireless-capable smartphone and/or device (e.g., tablet). The application may have capabilities and/or functionality directed to integration with mobile wireless (Wi-Fi®), geo-location, near field communication ("NFC"), Bluetooth® beacons, and Internet-based technologies to identify and validate a customer's specific physical location within a given business establishment equipped with corresponding detection capabilities to, in turn, enable location specific service options to improve customer service responsive and/or efficiency provided by the business establishment.

More particularly, one or more embodiments disclosed herein receive, as input and/or detected, and consider multiple attributes including (for example, but not limitation thereto): geo-location, smartphone IP address, and/or business establishment IP address, business specific electronic data stored on NFC tags affixed to convenient customer-accessible locations, e.g., restaurant tabletops, allowing for customers to check-in, place food and drink orders and connect with business establishment internal point of sale (POS) systems for communicating and managing customer service needs, orders, and payments.

Embodiments disclosed herein relate to an application, installable on a customer's smartphone or device, to assess and provide, e.g., at least based partially on a customer's detected physical location within a business establishment via NFC, business-specific service options. Correspondingly, an application and/or a software package installed on computing resources, e.g., a server, at the business establishment, may identify each customer based on his or her exact location as identified via NFC functionality to later securely authenticate each customer to transact business with him or her via, for example (but without limitation thereto): a server-side algorithm based at least partially on a weighted-decay function.

By way of example and not limitation, in a business such as a brick-and-mortar retail restaurant establishment, disclosed systems and methods of use thereof may: (1) identify a customer's location within the business establishment relying upon NFC technologies, e.g., allowing for the customer to alert the business of his or her presence and location by bringing his or her smartphone within a prescribed proximity to a NFC-equipped location, such as a NFC tag placed on a restaurant table-top; (2) at least partially based on the customer's identified location, display business-specific service options such as (but not limited to): food and/or drink items from a menu from which the customer may order, various other customer service related options (e.g., requesting replacement silverware, napkins, etc.), payment options (credit card, debit card, cash, personal check, money order, etc.), and any other business-specific options to conduct a monetary transaction with the business by directly integrating with a point-of-sale ("POS") system of the business from the customer's smartphone and/or device; (3) utilize wireless telecommunications capabilities associated with the customer's smartphone and/or device to allow the customer, upon receiving input therefrom, place and subsequently communicate business-specific service requests to the business or to the business staff over, for example (but not limitation thereto), the Internet or a Wi-Fi connection instantly; (4) synchronize the updates/changes made in the restaurant Point of Sale (POS) system directly into mobile application instantly. For example, the application as installed on a customer smartphone and/or device may immediately display pricing alterations and/or updates, variations in menu options and/or availability, a new daily special menu, a happy hour menu, and so on and so forth; and, (5) a method of accurately detecting a customer's physical location within a business establishment (e.g., so-equipped with any necessary NFC-related technology) by relying upon specific location attributes as provided by the application installed on the customer's smartphone and/or device and an algorithm installed on a server associated with the business establishment, the algorithm using a weighted decay function to securely authenticate the customer with the business's POS system. Integration of any one or more of the presented functional capabilities of the disclosed example systems and methods of use thereof may further contribute to enhancements in branding and/or marketing of the business establishment, e.g., emphasizing optimal efficiency in view of implantation of any one or more of the aforementioned technologies.

As envisioned, successful implementation of the disclosed systems and methods of use thereof will result in marked and quantifiable improvements related to customer service responsiveness and overall business operational efficiency, increased labor force utilization rates stemming from curtailed down and/or "lost" time, reductions in errors encountered during traditional order-taking, thus greatly improving customer satisfaction while imposing only a minimal overhead cost on the business. Time savings in, for example (but without limitation thereto), sending out wait staff to canvass restaurant floor space only to either not be called aside for assistance, or to be called aside for assistance excessively, will largely be eliminated with the appropriate identification and staggering of incoming customers to fill tables at max capacity and to send out wait staff in a targeted and efficient manner.

In one or more of the disclosed embodiments, business implementing the aforementioned systems and methods may be better positioned to market their goods directly to consumers by targeting displayed items to particular customer preferences. By way of example and not limitation, in a restaurant context, imagery and a related description of cuisine may be displayed proportionate to earlier choices made by the customer. Such a responsive menu display methodology may be visually appealing to the customer and allow for enhanced customer service provider efficiency, e.g., permitting for wait staff to immediately delivery food and drink items more rapidly without otherwise having to provide additional information related to assisting the customer in making his or her subsequent order decisions, unless specifically requested to do so. Such techniques reduce down time, increase customer turn over (e.g., as satisfied customers depart the business establishment) to thereby increase sales and the overall profitability of the business.

The disclosed systems and methods permit business establishments to make necessary changes on-the-fly, e.g., by modifying prices of goods and any related options proportionate to the availability of products, raw materials, and the like. Disclosed embodiments also provide for one-click ordering by the customer (once after all necessary selections are made) and may thus reduce difficulties otherwise often encountered in receiving customer orders or making any related changes. Existing wait staff are thus relieved from performing repetitive customer care duties and due diligence and may use freed up time to cater to customers in a responsive, as-needed, basis to also optimize tip-earning efficiency. Thus, according to embodiments of the present invention, staff errors in delivering ordered food/service to right location are reduced. Customer satisfaction is improved, while any mix up and unpleasant customer experiences associated with orders going to another adjutant table are avoided. Often the waiter involved in taking a food order is different from the staff involved in delivering the order to a table. Embodiments of the present invention help track orders associated with an exact location of the patron and prevent order mix ups when delivering an order to a table.

Description of System Structure

FIG. 1 illustrates an exemplary schematic diagram of a retail business establishment, e.g., a restaurant, equipped with near-field communication ("NFC") tags and corresponding wireless powering and/or detection capabilities for customer location identification and for intaking customer reservation and food and/or drink requests, in accordance with an embodiment of the present invention. In the present embodiment, a schematic view of a near-field communications ("NFC") based wireless telecommunications system 136 implemented in a business establishment 100 is shown, where one or more doors and/or entrances 106 may open into the business establishment permitting for ingress and/or egress of one or more patrons and/or customers 102. The business establishment 100 is shown here as a restaurant for example purposes, although those skilled in the art may appreciate that similar such configurations and/or orientations may exist for related retail brick-and-mortar business establishments, including (but not limited to): sporting goods stores, bars, wineries, meeting halls, conference centers and/or rooms, hotels, resorts, spas. Moreover, the business establishment 100 need not be limited to enclosed spaces, as disclosed systems and methods of use thereof may be adapted for outdoor and/or indoor-outdoor hybrid configurations, including (but not limited to): parks, water parks, pools, theme parks, vacation destinations and/or the like. By way of example and not limitation, during typical operation and/or usage of the NFC based wireless telecommunications system 136 integrated with the business establishment 100, the customer 102, with his or her own portable electronic device 108, may enter into the business establishment 100 through the entrance 106 to be seated at (or, alternatively, seat himself or herself directly) a table 114.

Alternatively, the customer may pre-configure the portable electronic device 108 by, for example (but not limitation thereto), tapping it with a finger to communicate a reservation request to the NFC based wireless telecommunications system 136 integrated with the business establishment 100. In such a circumstance, the NFC based wireless telecommunications system 136 may accordingly record and/or communicate the reservation request from the customer 102 to a server 128 and/or a business establishment management team 126 for appropriate further action, e.g., keeping certain tables 114 open for customers 102 who have made reservations prior to arriving at the business establishment 100.

Subsequent to being seated at a table 114, e.g., by himself or herself, with the assistance of a wait staff member (e.g., a waiter, waitress, host, or hostess), the customer 102 may proceed to engage with the NFC based wireless telecommunications system 136 by bringing, for example, his or her portable electronic device 108 into a pre-defined proximity and/or region of individual NFC tags 112 that may be affixed onto or near a table top surface of each table 114 for appropriate detection and/or wireless communication between the portable electronic device 108 and the NFC based wireless telecommunications system 136. Those skilled in the art will appreciate that the lay-out of the tables 114 shown in the business establishment 100 is provided as an example and is thus non-limiting. Other suitable configurations of the tables 114, or other representative seating surfaces or locations for the customers 102 may exist without departing from the scope and spirit of the disclosed embodiments, e.g., a bar area 120, a group or party seating area 122, and so on and so forth. NFC permits for rapid and reliable communications in close proximity configurations, thus layout of the business establishment should not be a concern given that customers will be able to easily access NFC tags included on table top surfaces, for example, regardless of the particular layout of the business establishment. NFC and phone can communicate even when a NFC device is covered by a table cloth. NFC uses the electronic field generated from an electronic device like cell phone to generate power needed to send previously encoded information back to the device. The layout of the room does not matter in proper functioning of the device. A tap using a mobile phone on the NFC tag is all that is needed.

Near-Field Communication Tag Functionality and Integration with the System

As generally referred to in the art and defined herein, near-field communications ("NFC") refers to a set of communication protocols that enable two electronic devices, one of which is usually a portable device such as a smartphone, to establish communication by bringing them within 4 cm (1½ in) of each other. [Source: Cameron Faulkner. "What is NFC? Everything you need to know". Techradar.com. Retrieved 30 Nov. 2015.] NFC devices are used in contactless payment systems, similar to those used in credit cards and electronic ticket smart cards and allow mobile payment to replace or supplement these systems. This is sometimes referred to as NFC/CTLS (contactless) or CTLS NFC. NFC is used for social networking, for sharing contacts, photos, videos or files. [Source: Pelly, Nick; Hamilton, Jeff (10 May 2011). "How to NFC". Google I/O 2011. Retrieved 16 Apr. 2014.] NFC-enabled devices can act as electronic identity documents and keycards. [Source: "NFC as Technology Enabler". NFC Forum. Archived from the original on 22 Dec. 2013. Retrieved 15 Jun. 2011.] NFC offers a low-speed connection with relatively simple setup that can be used to bootstrap more capable wireless connections.

NFC tags 112, as associated with and/or used by or with the NFC based wireless telecommunications system 136, may have a variety of shapes, sizes and/or forms and may be employed as, for example (but without limitation thereto): (1) static; or, (2) dynamic NFC tags. As generally understood in the art, and as defined herein, static NFC tags only transmit a (data) payload, do not have dynamic code generation ability and may not support stronger security mechanisms, but may be less expensive and/or difficult to implement. In comparison thereto, dynamic NFC tags can use Time-based One-Time Password algorithms ("TOTP") compatible with the NFC based wireless telecommunications system 136 to implement two factor authentication. In such implementations, the NFC tag is authenticated using TOTP before the encoded data is accepted from it. The dynamic tag implements a specific algorithm on a code assigned by the server. Only the central server is aware of an assigned application and can decode the value on the backend. Dynamic tags are used to validate that tags are indeed issued and registered with the servers. Pre-registration and dynamic code generation provides additional security mechanism to eliminates the possibility of the copying of tags by an antagonist and using those to place false orders or make requests.

NFC tags 112 are known to be readily commercially available and may be further prepared or particularized to store any form of data. As discussed here for implementation in the NFC based wireless telecommunications system 136, NFC tags 112 integrate with wireless communication capabilities of the portable electronic device 108 to be read thereby, e.g., that the portable electronic device 108 may be held near the NFC tag 112 to read and/or otherwise wireless communicate therewith. Data retrieved from reading the NFC tag may be received and processed by a computer software-based application installed on the portable electronic device 108 to further wirelessly communicate with the server 128 and the business establishment management team 126 responsible for monitoring the server 128 to be, in an embodiment, combined with a server-side software algorithm. Application configuration data may be at least temporarily stored on the server 128 with a specially designed data format stored on NFC tags 112 for appropriate identification thereof relative to the customer 102 to, for example (but not limitation thereto) identification of an exact physical location of the customer 102 within the a business establishment 100. Once the physical location of the customer 102 is identified within the business establishment 100, the application may provide updated options to meet particular needs of the customer 102 and the business establishment 100 at the identified location, e.g., providing mixed drink options to the customer 102 at the bar area 120. The customer 102 may then, for example (but without limitation thereto), use an input medium 110 (such as a stylus or other data input instrument, inclusive of a human finger and/or thumb) to input selection preferences into the application via a touch-screen interface of the portable electronic peripheral 108, e.g., such as an Apple® iPhone® and/or the like to proceed with an ordering process, etc.

Integral with the NFC-related functionality and/or capabilities as discussed above, the portable electronic peripheral 108 may have an internet protocol ("IP") address assigned to it by a cellular or internet service provider ("ISP"). The IP address may assist identification of a location for the phone, e.g., country, state and the city of operation. By way of example and not limitation, the server 128 may be configured to at least temporarily maintain a database of IP addresses corresponding to particular customers 102 and location mapping of the customers 102 relative to their respective IP addresses, e.g., to filter out invalid service requests originating from unregistered users and/or patrons outside of a defined service area, etc. The server 128 may, for example (but not limitation thereto) identify and set a city in corresponding to the customer 102 during his or her visit of the business establishment 100 by performing a cross lookup with one or more other IP address mapping databases maintained in a cloud 130 location.

The algorithms receives the following inputs from a consumer application: a user id, a password, a user's geo-location that is retrieved by the application running on a phone, IP address of the phone making, information encoded and read from a NFC tag tapped by the user (including, for example, the establishment identified (ID), revenue center (ID), table number and chair number), IP address assigned by users mobile service provider. The consumer application sends all these parameters to the central server. The central server maintains a database of a registered establishment. At registration, the server records an establishment's physical address and determines the geo-location co-ordinates, which are stored in the database. The goal of the process is to identify that a guest requesting service is indeed at the specific location so that they directly interact with the restaurant POS system to enter their orders. The POS system can send those orders directly to a kitchen for preparation without any interaction with wait staff. The server authenticates with the third party POS server using authorized credentials on behalf of the guest. It is very similar to a server entering credentials to enter an order in the restaurant's POS system. However, here, the application enters the credentials electronically using an API. A server algorithm validates that consumer order request coming from a device is in close proximity of the establishment by checking the IP address and who issued the IP address. There are web services APIs available to check an IP address and find the approximate location of the cell phone tower and carrier that issued the IP address. The server algorithm validates that the IP address and geo-location received are at least from a same city or region. Upon this validation, the server checks if the business establishment where the service is requested is at the same location. NFC devices send the restaurant ID, and, using the restaurant ID, the central server determines the geo-location and physical address of the restaurant. The central server validates that the geo-location and physical address of the restaurant match. After that, a validation process checks if the establishment has the revenue center and table IDs defined in the POS system. When all above parameters are determined to be valid, the server checks if the NFC tag ID is the same as the one configured using the business establishment application. The restaurant ID and tag ID are stored in the central server for cross validation. Each tag receives a unique ID having an expiration duration. The tag ID and expiration duration are validated. This determines that the consumer is indeed at the location. When a customer places an order with the central server using their mobile device and the previously configured POS user ID and password, the algorithm establishes a session with the restaurant POS system using, for example, REST APIs and sends the order information to the POS system. The POS systems registers the order for the table and routes the order to kitchen for preparation or routes the service request to the waiter.

The geo-location, IP address and NFC tag information allows the server to credibly determine the location of a mobile device. The guest mobile application can customize the application interface, menu, services options, specials etc. for that location. For example, if the customer is in a bar area, the customer would see a bar menu. If customer moves to a table and taps a NFC tag, then the application can present a customer interface to show table service options and services menu. Tags store specific location where they are posted. The business owner deploys the tags using a business side application. The application writes the data to the tag and sends that information and tag ID to the server. The server records the tag, location and business information in the database. When a patron scans the tag using customer mobile application, the application reads the business specific data stored on the tag. Along with the tag data, the patron's login credentials (login ID, email ID, phone number, carrier issued IP address, type of phone, browser or application version), and the phone's geo-location is sent to the server. The algorithm determines customer location based on the above information. Access to the POS is only granted to enter orders and to post payment. Information, such as available menu, prices, and promotions, are not retrieved from the POS. The solution may use the patron's location information along with their preferences, spending habits and match those to business's promotional messages, coupons, rebates, and incentives. The customer's information may be shared anonymously with other businesses for promotional or advertising activities. The solution may send location and/or non-location specific promotions, and advertisement to a customer. For example, if the application determines that customer's specific spending habits, and if the customer is around a preferred business location that matches the preferences, the server would send promotional information to the patrons phone as a notification. The server gathers login ID, password, phone number, carrier used, phone IP address, geo-location, and email address. Orders that a customer entered on the phone are stored in the database and may be used for targeted promotions.

In one or more embodiments, the customer 102 may scan the NFC tag 112 at any location within the business establishment 100 as shown in FIG. 1 to begin interacting with the server 128 and the business establishment management team 126, who may regularly monitor and/otherwise review customer 102 input and/or requests as reflected in the server 128. Moreover, the NFC tags 112 may be programmed with location-specific details using, for example, a business side application intended for functional integration with a customer-side application installable on the portable electronic device 108 of the customer 102.

URL-Based Identification Functionality

By way of example and not limitation, a business side application, intended to function in tandem with a customer-side application installable on the portable electronic device 108 of the customer 102, may be used to author or otherwise dictate the individual locations of the NFC tags 112 in the business establishment 100. Accordingly, the NFC tags 112 may be prepared or otherwise configured to each store location related information, e.g., including (but not limited to) specific parameters such as business name, revenue center, service location (e.g., table, chair, bar stool, shelf, dispensing location, station, etc.) in the form of a uniform resource locator ("URL"). Location specific parameters may be assigned, within the business side application, a name and a value. A suitable URL scheme may be specifically designed for the server 128 to parse and uniquely assign values for various business specific parameters. A sample URL for a restaurant table may be, in an embodiment, substantially at least as follows: —https://guest.quickze.com/restaurants/db6euCjDhjcFPJZYf?tn=52&rc=4vRAb2&td=BFNhy2. A specific URL associated with a business us used to determine that the request is coming from a guest visiting a business. This differentiates a request coming from business facing mobile application (restaurant.quickze.com for restaurant requests), /restaurants determines that the request is from a mobile phone near a restaurant (the parameters could be hospitals, resorts, casinos, cruise-liner etc. depending on the type of business establishment the NFC tag is issued for), /db6euCjDhjcFPJZYf is the unique id to identify an establishment in the central server and generated at the business registration time. tn=52 is the table number 52, rc=4vRAb2 is revenue center configured in the restaurant POS system, td=BFNhy2 is the identifier of a specific NFC tag. Additional parameters may be added depending on business identification requirements. Some parameters such as chair id attached to the table may be included to help the business identify source of order. URL data is encoded on the tag and server interprets the URL based on server side algorithm.

The encoded example URL above may have multiple parts. A part may identify the server location e.g., "https://guest.quickze.com/". This part uniquely identifies which particular server 128, as may be associated or otherwise affiliated with the business establishment 100, that the customer 102 may be interfacing with. The term "guest" in the URL may reference a guest application server as to be further explained in the database architecture diagram with reference to FIG. 2 and/or FIG. 5. Another part of the URL may identify the type of business establishment 100. In the above example URL, the business establishment 100 is identified as a restaurant: (/restaurants) in yet another part. A still further URL part of identifies a specific restaurant: (/db6euCjDhjcFPJZYf). This identifier may be created when registration using the server 128 side registration with the business establishment 100 is completed. This part may be stored on, for example, the cloud 130, to cross-reference with the application installed on the portable electronic device 108 of the customer requesting, for example (but without limitation thereto) a specific restaurant from restaurants database. This part may indicate to the cloud 130 on a backend to research from a pre-stored restaurants list to correspondingly return all restaurant-specific settings, images, service options, available options, and latest menu. And, URL query parameter (?tn=52&rc=4vRAb2&td=BFNhy2) may a specific revenue center in within the business establishment 100, e.g., the table 114 therein, or even a chair in the bar area 120 setup with the NFC tag 112.

An URL query string that is used to pass different parameters is an established practice in the industry. However, according to embodiments of the invention, an URL is stored on the NFC tag and read when a patron taps their phone on the tag. Information from the tags is read electronically and patrons do not have to enter any information in the browser. Patrons do not see or updates the URL in anyway while using the mobile application. IP addresses and geo location are passed in the HTTP POST from the mobile application to the server.

Combination of information received from the patron's phone application along with URLs read from the NFC tag are interpreted by the server algorithm to determine what to display on the consumer application, including but not limited to restaurant/establishment services offered, menu, menu images, restaurant branding, options, allergy and calories information etc.

Operationally, various individual characteristics and/or identifiers of the business establishment 100 may be assigned by, for example (but not limitation thereto), from computing resources associated with the cloud 130 to the server 128 related to identifying and communicating with the customer 102 via detection thereof as accomplished via the NFC tags 112 as substantially described above. Individual options may be associated by the server 128 and/or the cloud 130 with individual NFC tags 112, e.g., allowing for the convenient and secure identification of a customer 102's physical location within the business establishment 100 upon bringing the portable electronic device 108 within the prescribed detection range of any given NFC tag 112. Correspondingly, the server 128 may store such customer 102 location and/or order preference related data, upload at least some of that data to the cloud 130 upon demand to do so, and/or display such data at a business computer terminal 132 for the convenience of the business establishment management team 126.

That is, when the customer 102 enters into the business establishment 100 to proceed to "check-in" as so-described above, e.g., by bringing his or her portable electronic device 108 into a pre-defined proximity of the NFC tag 112 for appropriate detection thereby and/or wireless communication therewith, as generally known and defined herein as "tapping", an application installed on the customer 102's portable electronic device 108 may read, for example (but not limitation thereto), the URL registered on that particular NFC tag 112 and/or any tag identifier associated with it (e.g., either physically and/or electronically) to wirelessly communicate and/or transmit any related data the server 128 and/or subsequently to the cloud 130. Various computational processes and/or algorithms performed by and/or otherwise associated with the server 128 and/or the cloud 130 receive and consider parameters, identification protocols such as individual IP addressed associated with and/or otherwise representative of individual customers 102. And, by way of example and not limitation, various other NFC tag 112 related identifiers and/or URL parameters associated with a customer-based application, and/or a business-based application corresponding thereto, may at least partially contribute to the server 128 and/or the cloud's 130 ability to cross-validate and/or otherwise identify customer 102 related credentials. Thus, such a configuration as so described may permit for the server 128 to uniquely identify each customer 102, e.g., as based at least partially on a consideration of individual IP addresses of each customer 102 entering into the business establishment 100, while also concurrently authorizing the NFC tag 112 the customer 102 used for checking-in as issued for a specific restaurant for a specific location.

In circumstances where there may be a mis-match of customer 102 related identification credentials, e.g., the individual IP address associated with his or her portable electronic device 108, and the expected credentials of the customer 102 at a given NFC tag 112 location within the business establishment 100, the customer 102 may be rejected for seating at that particular table 114 with that particular NFC tag 112, e.g., such a situation may arise if the customer, for example (but not limitation thereto), made a reservation earlier to sit at the bar area 120 but later seated himself or herself at the table 114, the NFC tag 112 at the table 114 may reject the customer 102 and thus further prevent him or her from proceeding in an automated order placement process via the customer-based application installed on his or her portable electronic device 108. Such a process workflow for identification of the customer 102 permits for unique authentication using an IP address representative of the portable electronic device 108 of the customer 102 while simultaneously guarding against the inadvertent usage of duplicate tags.

Online reservation and consumer's table assignment are unrelated. Restaurant or establishment assigns a specific table or room to a guest when taking a patron off waiting list. Patrons can participate in the restaurant reservation tapping an NFC tag posted near the restaurant entrance. Patrons name and party size information is passed to the server when NFC tag is tapped. Server creates an entry in to the restaurant waitlist electronically. Patron's name, phone number and party size collected from their mobile application are passed to the server. When a table is ready, staff can send a notification to a patron with a simple tap on a bell icon available in the restaurant side application. The restaurant application sends a SMS and in-application notification to the patron's mobile application. This invention eliminates need for dongle that restaurants provide today. The phone acts as a notification device. When a patron selects a table and enters and order, ability to change the table is disabled until the order is paid. Guest application does not accept new tag taps and does not change the table selected if a running order is placed in the POS system. This prevents the misuse or erroneous order entries. After the order is paid or closed in the POS, patron can again select a new table. The server keeps track of current orders, association with guest application session and order status in the restaurant POS.

By way of example and not limitation, in one or more embodiments, server 128 and/or the cloud 130 may include a specially designed application that may implement a weighted decay function, e.g., a type of specific exponential decay, to assign different pre-defined weightages and/or weight-based factors to each of the various customer 102 and/or business establishment 100 related attributes associated with particular NFC tags 112 by the server 128 and/or the cloud 130. For example (but not limitation thereto), the information associated with particular NFC tags 112 may be matched, cross-referenced, or otherwise tabulated and computationally processed by the server 128 and/or the cloud 130 upon checking-in therewith by the customer 102 such that specific pre-defined credentials associated with the customer 102 may receive a higher weightage score by the weighted decay function than other credentials to security identify, authenticate and determine the specific location of the customer 102 within the business 100.

A weighted decay function, or other function, may be used for NFC tag validation or to authenticate the customer. For example, NFC tag validation based on the ID and data encoded on the tags, a patrons geo-location determined in the mobile application, a patron's authenticated status with the server are given higher weitages. Carrier assigned IP addresses are used to validate the current selections. The weigted decay function is encoded as an algorithm and prioritiezes the elimination of misuse possibilities.

Global-Positioning-Service ("GPS") Related Functionality

Supplemental or alternative to the NFC tag 112 based functionality as so described above, the application installed on the customer's 102 portable electronic device may electronically communicate a global-positioning-service ("GPS") derived geographic location, e.g., referred to herein as a "geo-location" as well as the individual IP address of the portable electronic device 108 of the customer 102 to the server 128 of the business establishment 100 and/or the cloud 130 for appropriate recordation and/or tabulation. The application installed on the customer 102's portable electronic device 108 may also collect the last-known (e.g., as detected most recently prior to a current detection) geo-location or current geo-location (e.g., GPS-derived co-ordinates of the portable electronic device 108) to electronically communicate related information to the server 128 and/or the cloud 130.

By way of example and not limitation, geo coordinates representative of the customer 102's portable electronic device 108, e.g., as determined by GPS, may be used to look-up the business establishment 100 to validate the customer 102's exact physical location there-within. Such geographic coordinates may be cross-referenced and matched with corresponding location identification information particular to the business establishment 100 stored, for example (but not limitation thereto), at a time of registration of the business establishment 100 in the cloud 130. Thus, the cloud 130 may electronically communicate with the server 128 and/or the customer 102's portable electronic device 108 to appropriate identify the particular business establishment 100 (e.g., relative to other business establishments 100). Such information may be assigned a particular weightage and/or weight-factor in the weighted decay function used to securely authenticate the customer 102, where such weightage may further take into account reliability of information supplied by GPS, etc.

Geo-location in general is only accurate within 30 to 50 feet. Additionally, GPS does not work well under a roof. NFC and the server algorithm described in embodiments of the present invention herein are used to supplement coarse GPS to precisely identify a patron location inside an establishment under a roof.

Bluetooth® Low-Energy ("BLE") Functionality

By way of example and not limitation, one or more embodiments are disclosed such that the application installed and running on a customer 102's portable electronic device 108 may also rely on Bluetooth® low-energy ("BLE") beacons programmed to accurately identify one or more specific business establishments 100. As generally known and as defined herein, BLE beacons may broadcast a pre-determined signature tied to or otherwise representative of the particular physical business location of the business establishment 100 and may therefore be deployed at and/or otherwise functionally integrated with the business establishment 100 to, for example (but not limitation thereto) supplement or replace the NFC-related "check-in" functionality described earlier.

The application installed and running on the customer 102's portable electronic device 108 may connect to BLE beacons as soon as the customer 102 enters the business establishment 100 for launching the application. In an embodiment, the application may crossreference information it receives from one or more BLE beacons to determine the exact physical location of the customer 102. The one or more BLE beacons may transmit a algorithm and/or code to decode the NFC tags 112. The application for the customer 102 may accommodate functionality of the portable electronic device 108 regarding scanning of one or more BLE beacons, recognition and reading of any code produced and/or emitted thereby, and identification of business and/or revenue center specific information from the NFC tags 112 to customize an interface of the application viewable to the customer 102 on the portable electronic device 108. In one or more embodiments, the application installed and running on the customer 102's portable electronic device 108 may self-update to make specific options available particular to each business establishment 100, such as (but not limited to): changing to accommodate business specific branding and/or the specific services offered by the business establishment 100. BLE is used to supplement the server algorithm and eliminates the dependency of the server algorithm on geo-location availability. Using BLE identifies a patron's location within an establishment when the geo-location feature is turned off on the patron's device.

Application of a Weighted Decay Function for Secure Customer Authentication

By way of example and not limitation, the server 128 may employ one or more algorithms and/or calculative procedures, such as (but not limited thereto) a mathematical weighted decay function to determine, at least based partially on "check-in" related data produced upon the customer 102 tapping his or her portable electronic device 108 against and/or near the NFC tag 112 as so described earlier, to initiate electronic communication from the customer-based application to the server 128 and/or the cloud 130. Upon receipt of customer 102 related data, the server 128 and/or the cloud 130 may employ the mathematical weighted decay function to at least partially calculate a location confidence interval for the customer 102 checking-in at the NFC tag 112 based on one or more specific weightages and/or weight-based factors.

The calculation procedure explained above used weighted factors. The weighted factors are as follows: guest credentials, phone number, NFC tag information that includes (restaurant id, table ID, revenue center ID, chair ID), geo-location, IP address assigned to the patron's phone by carrier or Wi-Fi router, proximity of the IP address location to the restaurant's address registered in the server database, and existence of order from a table. The combination of the above facts and specific application function selected within the application grants or denies access to ordering or other related functionality such as entering a customer on waitlist or showing branding of a restaurant.

Weightages and/or weight-based factors may be specified for the application and/or adjusted for implementations of the NFC based wireless telecommunications system 136 in the business establishment 100 on a per-installation basis, e.g., chain restaurants may have particular weightages for factors that are different from sports bars that are still different from horse racetracks, and so on and so forth. Weight-decay, as implemented in by the mathematical weighted decay function may be defined, in particular enumerated circumstances, as multiplying each weightage and/or weight-based factor in a gradient descent configuration at each epoch, e.g., as generally understood and as defined herein as a reference point from which time is measured, by a factor "λ" smaller than one and greater than zero.

As an alternative or in addition to, other weight-decay formulations may be implemented inclusive of traditional exponential decay, defined as: $dN/dt = -\lambda N$, where "N" is a quantity in question, "t" is time, and "λ" is a positive rate known as the exponential decay constant. Solving the presented differential equation yields the following equation: $N(t) = N_0 e^{-\lambda t}$, where $N(t)$ is the quantity at time t, and $N_0 = N(0)$ is the initial quantity, i.e. the quantity at time t=0. Those skilled in the art will appreciate that the formulas presented here are as examples only and that other suitable formulas may exist to receive, differentiate between, and process various customer 102 related parameters particular to individual business establishments 100.

The algorithm used according to embodiments of the present invention is similar to page rank (https://en.wikipedia.org/wiki/PageRank) or edge rank (https://en.wikipedia.org/wiki/EdgeRank) algorithm. A Match Rank algorithm used according to embodiments of the present invention determine which restaurants should be displayed when an user launches the application. The algorithm takes number of factors in to account. Simplified version of Match Rank is presented as $\Sigma_l = U_e W_e d_e$, where $\Sigma_l$ is list of nearby restaurants/businesses within a specified square miles x, $U_e$ is the user's affinity for a business determined from location co-ordinates, and $d_e$ is the time based decay parameter with the attributes timestamps of the location co-ordinates. A list of businesses to display and authenticate is calculated from the current location based on last known geo-coordinates, device IP address and IP address affinity to a business address, and $W_e$ is pre-determined weightage assigned each of the user preference. This equation is used to determine proximity of the user to the geo location of registered businesses registered on the server. The server calculates the list of businesses in the proximity of the known user location. The last location weight is lower if the current time and location read time are far apart. If the location is fresh, server selects businesses with location co-ordinates that are greater than (X−k) and (Y−k) and less than Y+k miles apart and less than (X+k and Y+K) and greater than Y−k (where k is a constant for number of miles). The list of businesses is compared with the businesses scanned with the NFC tag. If the scanned business falls within the range, the selection is given a higher user affinity value. A tag value received from the NFC tag is then validated against the above parameter range, and if and only if the business and user location match, the user is authenticated to enter orders in a restaurant system. If multiple matches are found, the match with the higher timestamp and preference parameter is selected. If a perfect match is not found, the mobile application rejects any attempt to place orders into a business POS system. However, this behavior is overridden by providing a restaurant code which only restaurant staff can share with the guest. The user is then allowed to enter orders directly to into the POS. The secret code is only visible in the restaurant side application and known to the staff, The authentication algorithm overrides the mismatch determined in Match Rank algorithm and allows the guest to enter orders from into the restaurant POS system. This algorithm along with the NFC tag values provides the accurate results to select a specific business.

Pursuant to any one or more of the calculative formulas presented above and/or other formulas, the server 128, independently and/or in conjunction with the cloud 130, may determine if a certain minimum confidence threshold particular to the customer 102 at the business establishment 100 is met, such that both the location is trusted and the customer is authorized to thus conduct and/or transact business with the business establishment 100 through the NFC based wireless telecommunications system 136. If a confidence is lower than the minimum threshold, the server 128 and/or the cloud 130 may require additional challenges to be presented to the customer requiring additional verification data to, for example (but not limitation thereto), send a short-lived passcode to: (1) the portable electronic device 108 of the customer 102; and, (2) computational devices of the business establishment management team 126 that they (e.g., the business establishment management team 126) may then subsequently share with the customer 102 for increased security and in-person confirmation. If the passcode supplied to each (1) and (2) successfully match with one-another, a customer request session may be authenticated for the server 128 to create a secure session with the customer through, for example (but not limitation thereto) a business point-of-sale or point-of-service ("POS") system associated with the NFC based wireless telecommunications system 136. In one or more embodiments, the server 128 may use one or more pre-identified credentials stored in therein and/or in the cloud 130 to establish a secure session with the business POS to transact financial business the customer 102, e.g., payment for ordered food and drink items, etc.

The passcode that only the restaurant staff can share is accurate. Other future challenges may include scanning NFC tag presented by the restaurant staff. The NFC tag may include the additional authentication information such as staff name and id, restaurant name, shift name to allow entering orders in the business POS system.

Customer-to-Wait Staff System-Based Electronic Communication

In an embodiment, the server 128 and/or the cloud 130 may communicate instructions to the NFC based wireless telecommunications system 136 and the portable electronic devices 108 of the customers 102 to modify a list of available services, e.g., as displayed on a customer-based application, for particular business establishment 100 with, for example (but not limitation thereto): icons to display, available actions, offered menus, available services such as ordering food or drinks, view menu with images, pay final bill, split bill and pay partial bill, view current check total, modify order, daily menu items, business branding information, quick services offered, quick add-on order items, and/or the business specific recommendations and so on and so forth.

By way of example and not limitation, the customer 102 may request services available from the business establishment 100 through the NFC based wireless telecommunications system 136 by touching, e.g., by input medium 110, icons displayed on a touch-screen interface of the portable electronic device 108 as made available by the customer application. In an embodiment, when the customer 102 touches icons on a touch-screen interface of the portable electronic device 108 that are assigned for services, the status of the icon may be changed to indicate that the service has been requested by the customer 102 by methods including (but not limited thereto): changing the icon background and foreground colors, changing the icon itself, highlighting the icon, changing size, and/or the like.

Once the customer touches the icon, the customer application may create a short notification event to send it to the server 128. In an embodiment, the short notification event may include a data of a few bytes, or more. The server 128 may receive such information as electronically communicated via the (Not NFC; it would be over TCP/IP internet network) based wireless telecommunications system 136 to, accordingly, update a shared database stored at least partially therein, e.g., within the server 128, and/or the cloud 130 for continued monitoring of orders initiated by the customer 102 to, for example (but not limitation thereto) flag wait staff 104 over to the customer 102 as needed. The wait staff 104, in one or more embodiments, may login to the server 128 using the business computer terminal 132 to monitor such requests as input from one or more customers 102. The server 128 may also send notification messages to the customer 102's portable electronic device 108 regarding, for example (but not limitation thereto), the ordering and/or payment processes.

The POS systems may store the menu, pricing, specials etc information locally. The menu, pricing, menu availability, and food images can be read from the local system and synched up to the server in the cloud from the POS system. Menu, food images, availability, and services are then downloaded and distributed to the guest application when the user is in the restaurant.

Creation and Electronic Communication of Custom Notification Requests

The customer 102 may touch, e.g., using input means 110, a touch-screen interface of the portable electronic device 108, after being appropriately checked-in to the NFC based wireless telecommunications system 136 via tapping the NFC tag 112, to provide notification information, e.g., related to the physical location of the customer 102 within the business establishment 100 and/or order-related information input by the customer into his or her portable electronic device 108 via the customer application, to the server 128 and/or the cloud 130. By way of example and not limitation, such notification information may be displayed in a visually interactive manner, for example, an image. The image displayed may include an icon and text to identify a request type for quick recognition and responsive action. The notification type may include (but is not limited thereto): an image, sound, vibration, text (both SMS and in-app) notification, and/or the like.

In an embodiment, the server 128 may forward such received notification information only to relevant wait staff, e.g., wait staff 104 that are subscribed to receive such notification information. For example (but not limitation thereto), various specific types of wait staff 104 members, e.g., waiters, waitresses, hosts, hostesses, busboys, etc., may be subscribed to receive messages regarding notification information pursuant to their defined job role, e.g., a waiter will receive new food and drink order requests, a busboy will receive a clean-table request once payment has been received from the customer 102 who has completed dining, etc.

Moreover, an administrator of the server 128, who may also be a member of the wait staff 104, may be authorized to set and update wait staff job assignment configurations as needed and further specify the particular type of notifications that each staff member may receive. Such notification information provided by the server 128 to the wait staff 104 may be delivered via a variety of communicative means, inclusive (but not limited thereto): a mobile phone, a "smart" wearable device, and/or a screen (e.g., electronically and/or wirelessly communicatively connected to the NFC based wireless telecommunications system 136) to be displayed in at a desirable location within the business establishment 100, and/or the like.

As further shown and discussed in connection with FIG. 5, the NFC based wireless telecommunications system 136 provides the business establishment 100 a means to create custom notification requests, e.g., through relatively simple and straight-forward touch-screen interface functionality. In practice, wait staff 104, pursuant to receiving instructions from the business establishment management team 126, may interface with the business computer terminal 132 to add custom notification request types. For example (but not limitation thereto), alerted and non-alerted icons may be used and/or otherwise needed to enable notification request becoming and/or being available on the NFC based wireless telecommunications system 136. Accordingly, upon entrance and implementation of updates made by the wait staff 104 as so described, NFC tags 112 may be correspondingly updated such that customers 102, upon tapping their respective portable electronic devices 108, receive updated information, e.g., changes to menu items, change in menu pricing, change in menu availability, change in the POS system of the business establishment 100. The server 128 and/or the cloud 130 may be so-equipped to instantly publish such changes via the NFC based wireless telecommunications system 136, inclusive of NFC tags 112 and/or the portable electronic devices 108 of individual customers. The NFC based wireless telecommunications system 136 as implemented in the business establishment 100 may not require a restart, reconnection, or any other reset related action conducted by the customer 102. Such single-sided functionality may favor the business establishment 100 in substantially preventing the customer 102 from inadvertently tampering with the NFC based wireless telecommunications system 136, thus allowing for smooth overall reliability.

By way of example and not limitation, any one or more of the functional capabilities of the NFC based wireless telecommunications system 136 in using NFC technology with or without BLE capabilities may be further integrated in whole or any part with Internet-based technologies and/or a Wi-Fi connection instantly.

Reset of System by the Business Establishment

By way of example and not limitation, the business establishment management team 126 may be allowed by the NFC based wireless telecommunications system 136 to reset one or more requests, or parts thereof, made by the customer 102 from, for example (but without limitation thereto) a business application configured to correspond with the customer application. Such a business application may be installable in portable electronic devices such as smartphones and/or tablets held by the wait staff 104 and/or may be a fully functional computer program software and/or suite installed on the server 128 and/or the cloud 130. The business application, accordingly, may be accessed, changed, and/or updated as desired by the wait staff 104 and/or the business establishment management team 126 by either interfacing with their respective smart devices and/or engaging with business computer terminal 132.

Reset, as referred to herein, refers to, for example (but not limitation thereto) the removal of prior orders and/or related customer 102 initiated demands and/or information placed through the NFC based wireless telecommunications system 136 subsequent to entrance of the customer 102 into the business establishment 100 and checking in at a table 114 by tapping a NFC tag 112. Reset functionality may be varied and comprehensive, allowing for authorized members of the wait staff 104 and/or the business establishment management team 126 to, for example (but not limitation thereto) clear previously filled and/or executed table service requests and/or food and drink orders, replace consumed table settings in preparation for incoming new customers 102, and/or a litany or other tasks related to the ongoing successful management of the business establishment 100. Completed reset requests not only reflect updates in the business application, but also in corresponding apps for each affected customer 102, in that the customer 102 may also see that his or her dining session at the business establishment 100 has concluded and that all requested and/or pending orders have been filled as needed.

The reset function is used to reset the patron requests. After a patron's request is fulfilled, wait staff may tap on an NFC device affixed to the table to reset the request that the guest/patron generated. This reset will let others in the team know that the customer request has been attended to and customer requests are fulfilled. If the customer completes an order and payment transaction from the mobile phone application, wait staff may verify and clear the order by tapping the NFC device affixed on the customer table. Staff can also scan the NFC tag to enter or remove the orders from the table. The NFC tag identifies the specific location of a guest in a restaurant. The same location identifiers are used to reset the request by the staff. Scanning the tag in the waiter application identifies the location and the waiter application presents the options to reset the orders and/or completes outstanding requests on the table or location.

Further, when a particular customer 102's request is reset as so described above, the server 128 may clear the notification from its records and send reset request to connected business-application equipped devices at the business establishment 100. Likewise, notification of successful execution and/or completion of the reset signal and/or operation may also be sent to each affected customer 102's application to clear that request and to also notify, via the NFC based wireless telecommunications system 136, authorized members of the wait staff 104 and/or the business establishment management team 126 that the customer 102's request has been attended to by sending, for example (but not limitation thereto) an alert flag. Either or both of the customer-based and the business based application may then thus accept the alert flag and revert any associated request indicator to back to its original, e.g., "clear", state.

By way of example and not limitation, disclosed systems and methods herein relate to the configuring of the NFC based wireless telecommunications system 136 as implemented in the business establishment 100 to conduct multi-device communication with minimal delay using one or more specially designed protocols. Such a configuration avoids sending significant amounts of data to enhance overall operational efficiency, especially in circumstances facing a high number of overall users, e.g., wait staff 104, business establishment management team 126, and/or customers 102, by, for example (but not limitation thereto), sending only a request number a reset command. Such a shortened data format may assist in efficiently scaling the system to large number of users. In an example embodiment, a reset operation of the NFC based wireless telecommunications system 136 inclusive of any affected data appearing on business-related apps (e.g., as associated with the wait staff 104 and/or the business establishment management team 126) and/or the customer application (e.g., as associated with the customer 102) may occur within approximately one second.

Example Business Establishment System Implementations

By way of example and not limitation, the NFC based wireless telecommunications system 136 as implemented in the business establishment 100 may be employed in a variety of real-life brick and morter business establishments, including (but not limited thereto): restaurants; hospital rooms and/or beds, e.g., where patients may request nursing services and attention from a wirelessly and/or electronically connected smartphone and/or device by their respective bedsides; in casinos/gaming areas, e.g., where players may place drink or food orders while playing at a casino table or the gaming area; in hotel resorts, e.g., where patrons can order food and drinks by pool-side and/or beach-side seating areas; in theaters, e.g., where seated patrons can scan their respective specific locations once seated to place orders for popcorn, food items or drinks; in stadiums, e.g., where seated fans can order their drinks and snacks from their respective seats using their own smartphones; mine workers, e.g., who can request specific services from a remote in-mine location with a touch on a screen; guests in a hotel room, e.g., who can request toiletries or accessories for the room using an application from their respective mobile devices and/or devices placed in the room; and, so on and so forth.

Additional implementations of the NFC based wireless telecommunications system 136 as implemented in the business establishment 100 include (but are not limited thereto): shoppers at a large department store who can request/order apparel or shoe sizes directly from their mobile phone with a touch. In such an implementation, a NFC tag 112 may be attached to an item that may be configured to identify model, location, and color. A tap of the customer's mobile device on the so-configured NFC tag 112 will prompt the shopper to optionally: select size, place an order, and to pay for the ordered merchandise directly from the phone in the department store's POS station and/or area.

Moreover, specialized variants of the NFC based wireless telecommunications system 136 may be configured for business establishment 100 implementations such as (but not limited to): quick-service locations such as icecream shops, sandwich shops, etc., where customers 102 may order food and drink items from their own respective smartphones and/or devices while browsing displayed items and tapping on the NFC tag 112 placed next to it. The NFC tag 112, in such an application, may be pre-configured to provide location as well as item-related information to the customer application and to also prompt the customer to place an order directly in the store's POS station and/or region. Use of initially pre-configured and/or specifically-designed NFC tags 112 each having encoded data that the server 128 and/or the cloud 130 can decode may proactively address any potential security concerns and location identification issues.

Returning to the schematic representation of the NFC based wireless telecommunications system 136 implemented in the business establishment 100 as shown in FIG. 1, those skilled in the art will appreciate that the layout shown is for example purposes only and that other suitable configurations and/or layouts of the various pieces of equipment associated with the NFC based wireless telecommunications system 136 in the business establishment 100 may exist without departing from the scope and spirit of the disclosed embodiments.

By way of example and not limitation, the customer 102 may enter through the entrance 106 for self-directed seating and/or wait staff 104 assisted seating at the table 114, which may be located at any location throughout the business establishment 100, inclusive of the party seating area 122, the bar area 120. The location of the table 114 within the business establishment 100 may be substantially immaterial regarding wireless communications between the portable electronic device 108 of the customer 102 upon checking-in such that the customer 102 is substantially mobile within the business establishment 100 prior to seating, e.g., the wait staff 104 may effectively seat the customer at any table 114 and/or bar location at the bar area 120 without hesitation due to connectivity and/or service reach related issues.

As discussed generally above, any particular NFC tag 112 may accommodate the checking-in of the portable electronic device 108 of the customer 102 at, for example (but without limitation thereto), any table 114 to, at least partially in tandem with any one or more of the server 128 and/or the cloud 130, tabulate, locate, triangulate and/or otherwise identify the exact geographic location of the customer 102 within the business establishment 100.

After being seated at the table 114, the customer 102 may, via a customer-based application as so described above, enter one or more food and drink orders which may be wirelessly transmitted via the NFC based wireless telecommunications system 136 to the server 128 and/or the cloud 130 for any necessary processing and/or calculation. Such actions are inclusive of application of the weighted decay function as so described, to receive and re-distribute customer order related information to business-based apps. Such business-based apps may be installed on one or more smartphones and/or devices carried by the wait staff 102 and/or the business establishment management team 126, as well as the business computer terminal 132 allowing for the meeting of customer demands in a prompt and responsive manner.

Figure 2:
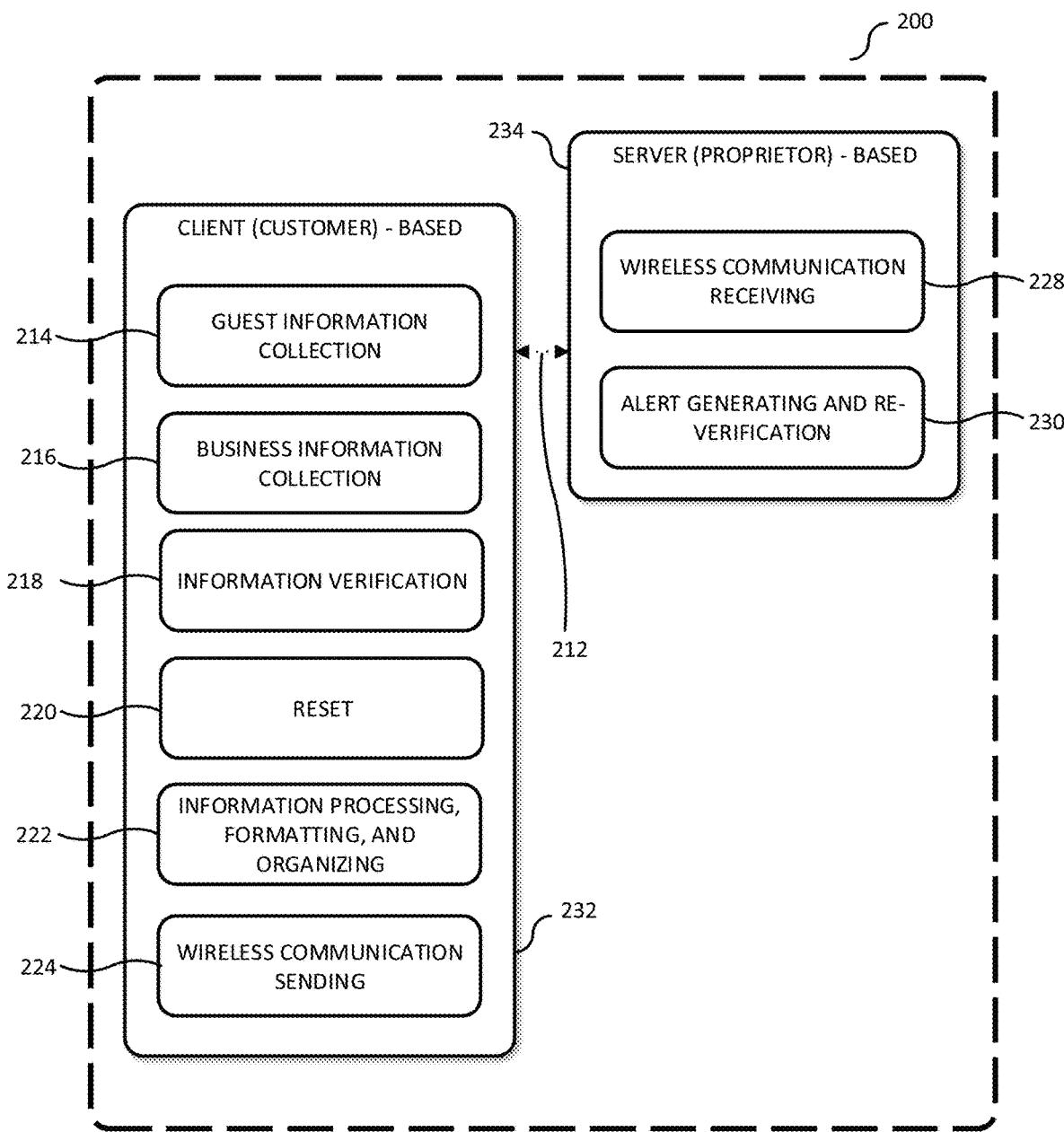
FIG. 2 illustrates an architecture of an exemplary system for identifying a customer location within a business establishment and/or for receiving customer input requests to communicate the same to a business server for responsive service to the customer, in accordance with an embodiment of the present invention.

FIG. 2 illustrates an architecture of an exemplary system for identifying a customer location within a business establishment and/or for receiving customer input requests to communicate the same to a business server for responsive service to the customer, in accordance with an embodiment of the present invention. As shown in the present embodiment, the system 200 may be configured to be at least partially executed in computer hardware, e.g., processor(s) and/or non-transitory memory, etc., and may include two distinct but interrelated and electronically communicative sub-systems, including: (1) a client (e.g., customer) based system 232; and, (2) a server (e.g., proprietor) based system 234. By way of example and not limitation, each (1) and (2) may be electronically connected to each other through a communication pathway 212.

Restaurants/establishments can issue special NFC tags to enter remote orders directly in the restaurant system. Restaurants share these tags with customers that normally place to go or pickup orders. These tags help the customer conveniently and quickly enter a remote order without selecting the city, restaurant, delivery address etc. When a remote customer's scans a tag, the mobile application automatically selects the restaurant which issues the tag and creates a session for remote pickup or delivery or future order. A customer specify delivery location or pickup preference is presented in the mobile application after order payment has been completed on the mobile application. A remote order with payment information is directly sent to the restaurant POS system for processing. These NFC tags make the remote order entry and specifying delivery/pickup order entry process easy for customers. The application knows to prompt for the payment, delivery location, and pickup time options when remote ordering NFC tag is scanned. Only after payment, the order is routed to the restaurant kitchen through the POS system.

Each (1) and (2) may, in one or more embodiments, be substantially similar to that presented and discussed above relating to the customer-based application and the business-based application, respectively. That is, the customer-based application, e.g., a software application installable on a portable electronic peripheral and/or device such as a smartphone, may include: a guest information collection module 214, a business information collection module 216, an information verification module 218, a reset module 220, an information processing, formatting, and organizing module 222, a wireless communication sending module 224, a wireless communication receiving module 228, and an alert generating and re-verification module 230. Those skilled in the art will appreciate that the various modules described herein above may be interchangeable in terms of placement and/or association with particular pieces of corresponding computer hardware configured to carry out related functionality. Moreover, any one or more of (1) or (2) as related to the system 200 may be practiced with a fewer or greater number of modules than that shown in the example embodiment of FIG. 2.

By way of example and not limitation, the guest information collection module 214 may have a means of capturing information regarding a guest who enters a business establishment. Such means may include NFC tags and/or NFC related functionality permitting for the automatic and substantially wireless identification of a customer's smartphone or device upon tapping as described earlier. Information available to be extracted by the guest information collection module 214 includes the exact geographic and/or physical location of the guest within a given business establishment employing the system 200.

The business information collection module 216 may have a means of information extraction, recognition and/or communication regarding identification of a particular a business establishment offering customer service responsive to a customer's demands. In an embodiment, the business information collection module 216 may supplement NFC-based system functionality specific to particular business establishment needs, e.g., the information collected by the business information collection module 216 may be different and distinct dependent on what type of business the business establishment is, e.g., a fine French restaurant versus a local sports bar. Such information may include the exact geographic and/or physical location of the business; various locations of defined areas and/or regions within the business; and, products and services offered by the business.

The information verification module 218 may have a means, e.g., computational algorithms and/or related procedures, of calculating and/or verifying customer (guest)-related and/or business (proprietor)-related information. In one or more embodiments, such information to be verified by the information verification module 218 may be supplied by NFC tags and/or smartphone devices of individual customers, as well as preferences input by business establishment managerial staff regarding the characteristics of the business, etc.

A reset module 220 may have a means of resetting information provided by customers (guests) and/or the business. The reset module may be substantially pre-set or pre-configured by the business such that the business may be only authorized to reset certain parameters, such as food prices, at certain times of the day, e.g., before or after individual dining shifts such that pricing does not fluctuate mid-meal (potentially surprising and also scaring away confused customers who are unaccustomed to such a practice). In an embodiment, the customer himself or herself may also be authorized to clear an order placed by mistake, for example, to reset that order request quantity to a start figure, e.g., zero ("0"), to re-begin the order process. Those skilled in the art will appreciate that re-setting functionality may take a variety of forms including partial to total reset of any one or more of variables, inputs, and/or other data-related factors involved in providing efficient customer service without departing from the scope and spirit of the present embodiments.

Information processing, formatting, and organizing module 222 may have a means of processing customer and/or business-specific information to effectuate enhanced customer service delivery. By way of example and not limitation, the information processing, formatting, and organizing module 222 may be at least partially implemented in computing resources, such as (but not limited thereto): a computer, a server, a mainframe, non-transitory computer-readable memory, and/or the like. In practical application, this may include processors installed in and/or otherwise operable with a customer's smartphone and/or device, e.g., as may be needed to run an application thereon, etc. Information regarding customer preferences for placing new orders may be received via touch-screen sensitivity, e.g., such that upon touching a relevant portion of the application when displayed and/or maximized on the smartphone, the application may: (1) process the incoming order request placed by the customer; (2) format the order request in machine-readable form suitable for subsequent wireless data transfer to a centralized server; and, (3) organize the data particular to the customer's request such that certain requests related to, for example, food, are appropriately channeled and directed to relevant wait staff whereas other requests related to the replacement of soiled table linens are directed to other busboys and/or the like.

A wireless communication sending module 224 of the client (customer) based system 232 may wirelessly communicate with a corresponding wireless communication receiving module 228 associated with the server (proprietor) based system 234. Those skilled in the art will appreciate that such wireless communications may take place over known standards and protocols, including (but not limited thereto): Wi-Fi (e.g., referring to a family of radio technologies that is commonly used for the wireless local area networking (WLAN) of devices which is based around the IEEE 802.11 family of standards). In one or more embodiments, the wireless communication sending module 224 may collect and/or otherwise receive data and/or information related to any one or more of the modules 214-222 incorporated within the client (customer) based system 232 to electronically forward such data or information, communicatively (e.g., bi-directionally), to the server (proprietor) based system 234 generally as may be related to the forwarding of customer-related orders and/or requests. Specifically, by way of example and not limitation, the wireless communication sending module 224 may send such consumer-related data, e.g., orders, etc., to the wireless communication receiving module 228 incorporated within the server (proprietor) based system 234 that may be installed in or on a server of a business establishment.

Further, in an embodiment, such a server may be in electronic communication with a central, "cloud"-based database, which may include a complete repository of all business establishments and associated characteristics thereof, e.g., to separate and identify each business establishment pursuant to its identifying traits to supply related data and/or information. The wireless communication receiving module 228 may thus, for example (but not limitation thereto), be different and reflective of the underlying business it supports, e.g., a fine dining restaurant may have specific order related data, inclusive of a back-log of hard to find meats and/or fishes, for example; in contrast; a popular neighborhood sports themed bar may emphasize capacity and through-put more than the quality of food prepared and served to customers, etc. The type and amount of data and/or information received by the wireless communication receiving module may thus be at least partially dependent on the type of business establishment supported by the server (proprietor) based system 234.

By way of example and not limitation, the wireless communication receiving module 228, in an embodiment, may have means electronically communicating with the alert generating module and re-verification module 230 enable the same to alert, for example (but not limitation thereto) business staff members by displaying a notification alert a corresponding business device running the server (proprietor) based system 234. The alert generating module and re-verification module 230 may also be capable of re-verifying incoming and/or outgoing data and/or information regarding the particular physical location of a guest in a given business establishment.

Those skilled in the art will appreciate that any one or more of the presented and discussed modules 214-224 of the client (customer) based system 232 and/or modules 228-230 of the server (proprietor) based system 234 may employ any appropriate computer-based computational algorithm to successfully organize, parse-through, interpret, manipulate, sort, process, and finalize data as may be relevant and/or desirable to enhance customer service provision efficiency. Moreover, any one or more of the modules 214-224 and/or the modules 228-230 may be integrated in multitude with the client (customer) based system 232 and/or the server (proprietor) based system 234 such that the exact configuration as shown in the system 200 depicted by FIG. 2 is not necessarily always required, and that such deviations from that shown remain within the scope and spirit of the disclosed embodiments. Such of the aforementioned modules may also work in any configuration and/or orientation, including (but not limited thereto): in series, in parallel, collectively, independently, and/or with outside systems and/or regional and/or global networks, as well as off-site technical support servers and/or systems.

By way of example and not limitation, in an embodiment, the system 200 may perform data manipulation of any one or more streams of data incoming, exiting, or traveling throughout any one or more of the modules in the client (customer) based system 232 and/or the server (proprietor) based system 234. Data manipulation, as both generally understood and defined herein, refers to, for example (but without limitation thereto): compression, encryption, formatting. In an embodiment, any module sending data may first compress the data prior to data transmission.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

Figure 3:
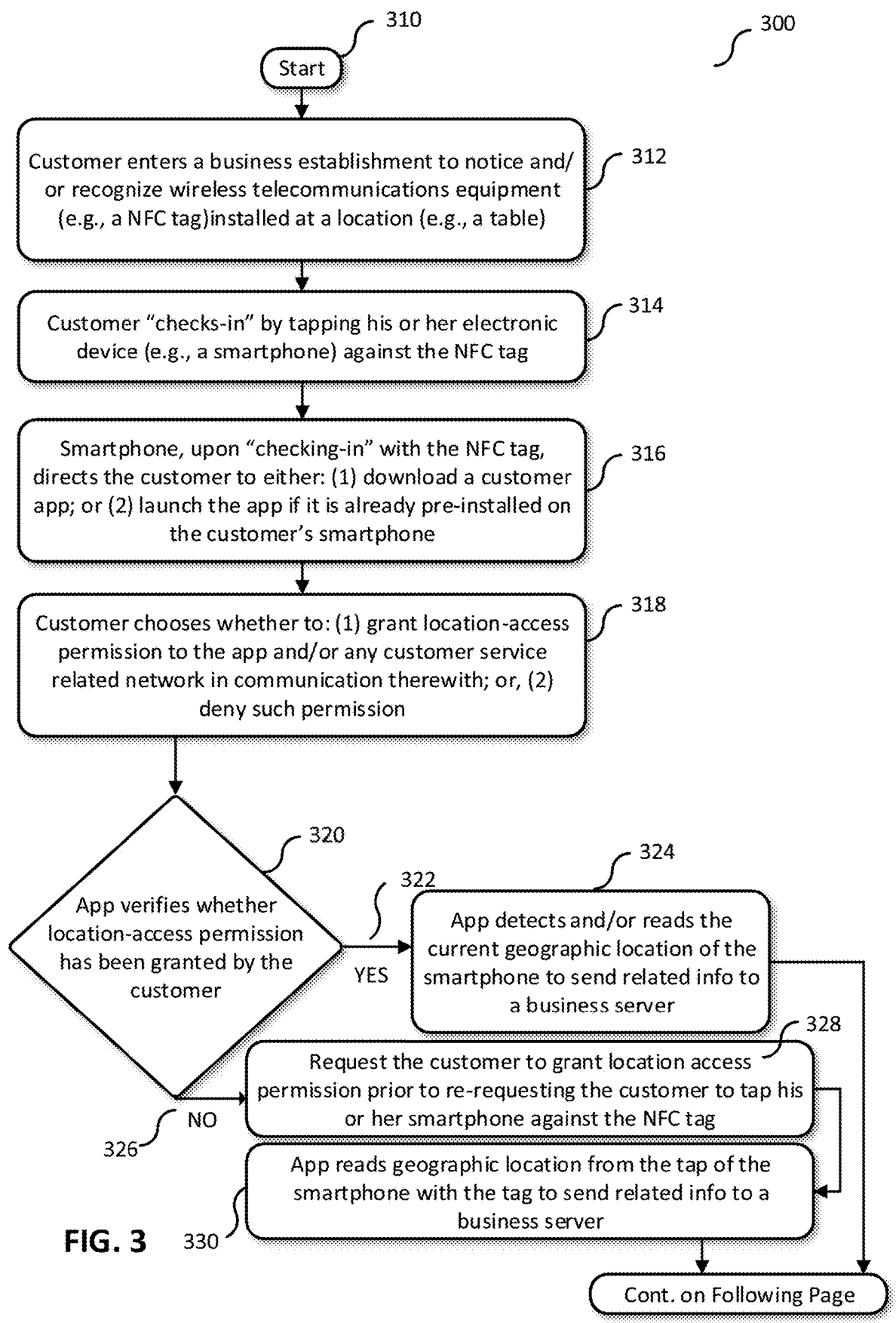
FIG. 3 illustrates a flowchart of an exemplary method for customer interaction to determine and validate a customer's location for optimizing customer through-put and interaction in a business establishment directed to provide customer service responsive to customer requests, in accordance with an embodiment of the present invention.

FIG. 3 illustrates a flowchart of an exemplary method for customer interaction to determine and validate a customer's location for optimizing customer through-put and interaction in a business establishment directed to provide customer service responsive to customer requests, in accordance with an embodiment of the present invention. In the present embodiment, a method for customer interaction 300 may begin at an initiation and/or start operation 310, which may include any one or more of the following options and/or capabilities: (1) a customer opening an application on a smartphone and/or device by touching a touch-sensitive icon on a screen of the smartphone to make a reservation for seating at a business establishment, such as a restaurant, at a specified time and date; (2) a customer planning to physically enter a business establishment to make preparations to do so, e.g., driving to a restaurant, etc. Those skilled in the art will appreciate that the above-described actions related to the start operation 310 are provided as an example and that other suitable options may exist without departing from the scope and spirit of the disclosed embodiments.

A customer may enter a business location at an entrance operation 312 with his or her smartphone to either seat himself or herself, or be seated by a host or hostess, at a table. At the table, there may be pre-installed wireless telecommunications devices, such as NFC tags, placed at easily accessible locations. The customer may tap, e.g., bring his or her smartphone into a pre-defined proximity of, for example (but not limitation thereto) four to five inches, of the NFC tag to "check-in", at a tap operation 314 to electronically and/or wirelessly alert the business establishment of the customer's physical presence at the location specified by the NFC tag.

Should the relevant customer-based application be already installed on the customer's smartphone or device used for the above-described "tapping", the application may thus launch at an activation operation 316. Alternatively, should the application not already be installed as so described, then the customer's smartphone may alert the customer to download the application as needed, where the customer may then, in response to such an alert, grant location access permission for the application The customer may grant location-access permission to the application and/or any servers in communication therewith based in the business establishment being visited by the customer in a location-access granting operation 318. The application may then verify such granting of permission in a verification granting operation 320, where a determination 322 of "YES" permits the application to read a current geographic location, at a read operation 324, from and/or as provided via checking-in of the smartphone with the NFC tag earlier (e.g., at the activation operation 316). Conversely, a determination 326 of "NO" requires the customer to first grant location access permission at a re-request operation 328 to again request the customer to tap his or her smartphone against the NFC tag to permit the application to read the customer's current geolocation from the NFC tag at a read operation 330. If the customer says "NO" to geolocation, the customer is not asked for location permission again. The scan includes the location information. The scan sends the location information received from the NFC tag. The customer's last good know location is used to match the tag location information for confirmation purposes. Entering onto a waitlist is not a loss prone use case. Even if the customer does not show up after requesting to be put on the waitlist, loss incurred is minimal and limited to lost business opportunity. Geo-location identification provides certain advantages, but is not necessarily required. Both the read operations 324 and 330 may forward the extracted geographic location to a server associated with the business establishment visited by the customer, e.g., a "business server". Even when no geo-location is available, scanning a waitlist is accepted and information received from the tag is trusted. The customer is entered in the waitlist with an assumption that customer will respond when a seat is available and notification is sent.

The business server may validate NFC-provided customer location information at a server validation operation 332 by, for example (but not limitation thereto), cross-referencing the NFC-provided customer location information with stored information, facts, and/or parameters from a local database, e.g., "cloud" location, to at least: (1) determine the profile of the business, e.g., the type of business, a fine dining restaurant, a sports bar, etc.; and, (2) the particular needs of the customer within the business. Accordingly, determinations may be made at server validation operation 332 to, for example, display imagery and/or touch-screen related functionality related to the particular nuances of each individual business, e.g., a fine dining establishment may thus provide a selection of fine wines and rare whiskeys, while a sports bar may include primarily low-cost domestic draft beers, etc. Fine dining places may provide valet services to their customer. Customer may wish use the a vehicle pull up request ahead of time just to avoid wasting time for valet staff to bring the car. However, valet parking may not be applicable for sports bar.

To accomplish the validation performed at server validation operation 332, any one or more of representative pieces of data stored in a database 334, e.g., that may be electronically stored in the business server and/or at least partially on a remote, Internet-based "cloud" location may be accessed, parsed through, retrieved, repositioned, and/or manipulated to accomplish (1) and/or (2) of the sever validation profile.

By way of example and not limitation, the database 334 may contain information pertaining to: business identification ("ID"), NFC tag ID, revenue center related information, e.g., a wireless-ready pay kiosk and/or station, any type of specific question-related "challenge" for verification of one or more NFC tags, an IP address map for comparing and filtering out requests originating from non-genuine sources to validate authorized customers, and specific geographic information inclusive of a table ID, a chair ID for a variety of business establishments.

The business server may prompt the customer to successfully answer a question, e.g., a validation "challenge", at a challenge-prompt operation 336 to validate the NFC tag checked-into by the customer, where a successful response indicated by "YES" at a NFC tag validation determination operation 338 results in progression to a showing operation 342, where business-specific application pages and/or functionality is shown related to: table seat(s), location, revenue center(s) (e.g., customer payment and/or point-of-sale ("POS")), and customer authentication w/POS centers, etc.

The customer is authenticated at authentication operation 344 with the restaurant POS remotely through use of an NFC tap, a credential challenge, and a restaurant specific daily changing code. Once, authenticated, the patron can use the application to accept the payments at customer payment operation 346 and post the payment securely directly to POS for processing. The application supports spit payments from each of the mobile devices authenticated and can post the payments to POS. Once payment balance on the POS is satisfied, the mobile app instructs the remote POS to close the order at close operation 348 prior to conclusion of the method for customer interaction 300 at an end operation 358. If a customer proves the payment information, strict authentication is automagically relaxed and orders are directly posted or closed on the remote POS system by the combination of the restaurant and application used by the customer.

Returning to the NFC tag validation operation 338, should the customer fail answer the "challenge" provided at the challenge-prompt operation 336, a determination of "NO" may result in the application providing an additional "challenge" question at additional challenge provision operation 352 requesting the customer to answer additional authentication related questioning, which may be then validated by the business server at a subsequent validation operation 354. Authenticity is determined at authenticity determination operation 356 to assess whether the method of customer interaction 300 may proceed to the POS authentication operation 344 or may return to the additional challenge provision operation 352. Those skilled in the art will appreciate that the order and/or configuration of the operations 310-356 the method of customer interaction 300 are shown as an example and that other suitable orders and/or configurations of the operations 310-356 may exist without departing from the scope and spirit of the disclosed embodiments.

Figure 4:
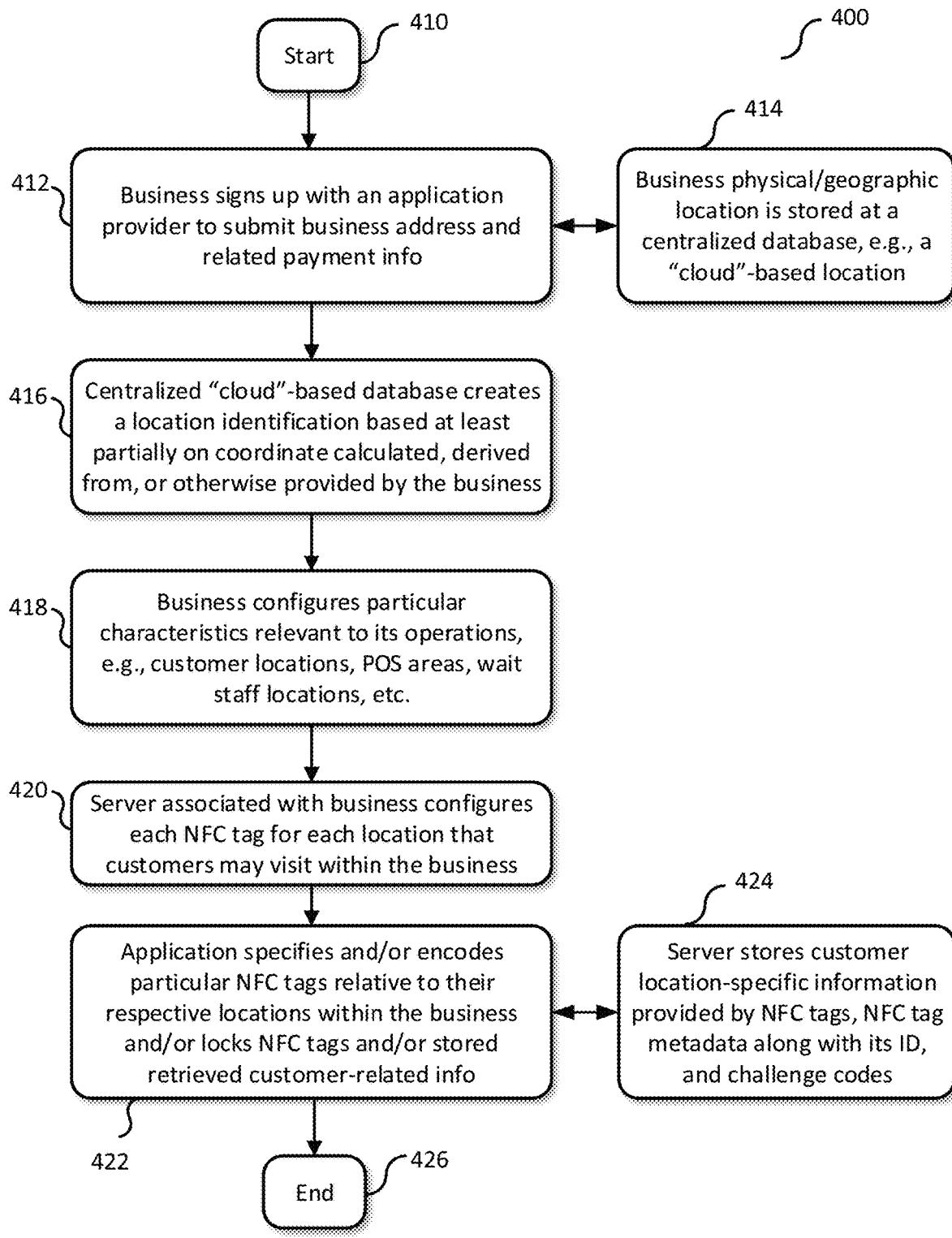
FIG. 4 illustrates a flowchart of an exemplary method for business establishment registration for optimizing customer through-put and interaction in a business establishment directed to provide customer service responsive to customer requests, in accordance with an embodiment of the present invention.

FIG. 4 illustrates a flowchart of an exemplary method for business establishment registration for optimizing customer through-put and interaction in a business establishment directed to provide customer service responsive to customer requests, in accordance with an embodiment of the present invention. In the present embodiment, a business registration method 400 is shown complementary to the method of customer interaction 300 shown and discussed with connection to FIG. 3. Operations 410-426 complement the method of customer interaction 300 by providing corresponding business and/or "cloud" based database data communications and/or functionality; e.g., essentially viewing customer-service related operations from a business establishment perspective, rather than that of the customer alone.

A start operation 410 allows businesses to sign up with an application provider to submit business address and related payment information at a business sign-up operation 412, where the business physical and/or geographic location is stored at a centralized database, e.g., a "cloud" based location at a geographic coordinate storage operation 414. The centralized database creates a location identification particular for the business at a business location set operation 416, where such a location identification may be at least partially based on information provided at the business sign-up operation 412 and/or any additional and/or alternative information electronically supplied from the business at any time in the business registration method 400.

Accordingly, the business may configure particular characteristics relevant to its operations at a business particularization operation 418 such that certain businesses may configure corresponding consumer-based apps to display certain options reflective of the business, e.g., a steakhouse may have various cuts of meat options along with cook types and/or times, whereas restaurants offering spicy foods may have provisions particular to the levels of spice available, etc. Business can configure the services offered such as valet service or sports accessories for example to play tennis at a tennis court in a resort. Business Application allows a business to configure NFC tags for their own custom needs 420. The application can write information onto NFC tags and encode the tags with its id, service type associated with a location and exact location, business information such as name and identifier special identifiers that identifies an authorized and trusted tag. The tags can then be installed at various locations for customer to use their mobile application to tap and to request services or to use for check-ins or get in the queue or wait line. NFC configuration step 420 occurs at the business registration time. Prior to the server and/or "cloud"-based database specifying and/or encoding particular NFC tags relative to their respective locations within the business to also lock NFC tags and/or store customer-related information, if so desirable at an encoding operation 422. During the encoding operation 422, the server may store business location specific information on the NFC tags, NFC metadata along with its respective ID, and various challenge codes at location information storage operation 424 prior to conclusion of the business registration method 400 at an end operation 426 are all stored in the database for later use. Business can create custom NFC tags to satisfy their customer's unique needs based on the specific services the business offers.

Figure 5:
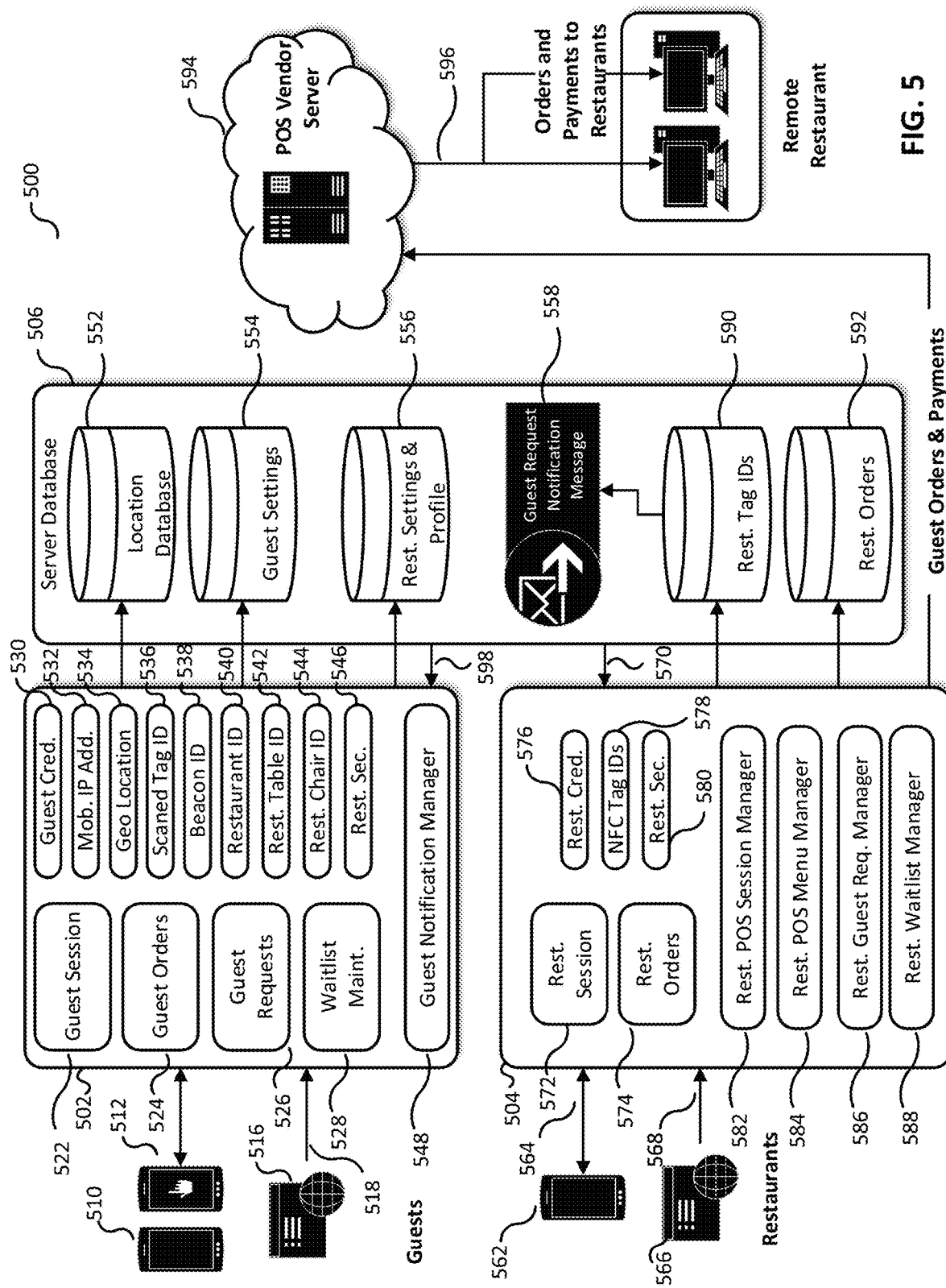
FIG. 5 illustrates an architecture of a system for receiving customer location and order related information and for cross-referencing that information with restaurant service capabilities to provide responsive customer service, in accordance with an embodiment of the present invention.
Figure 6A:
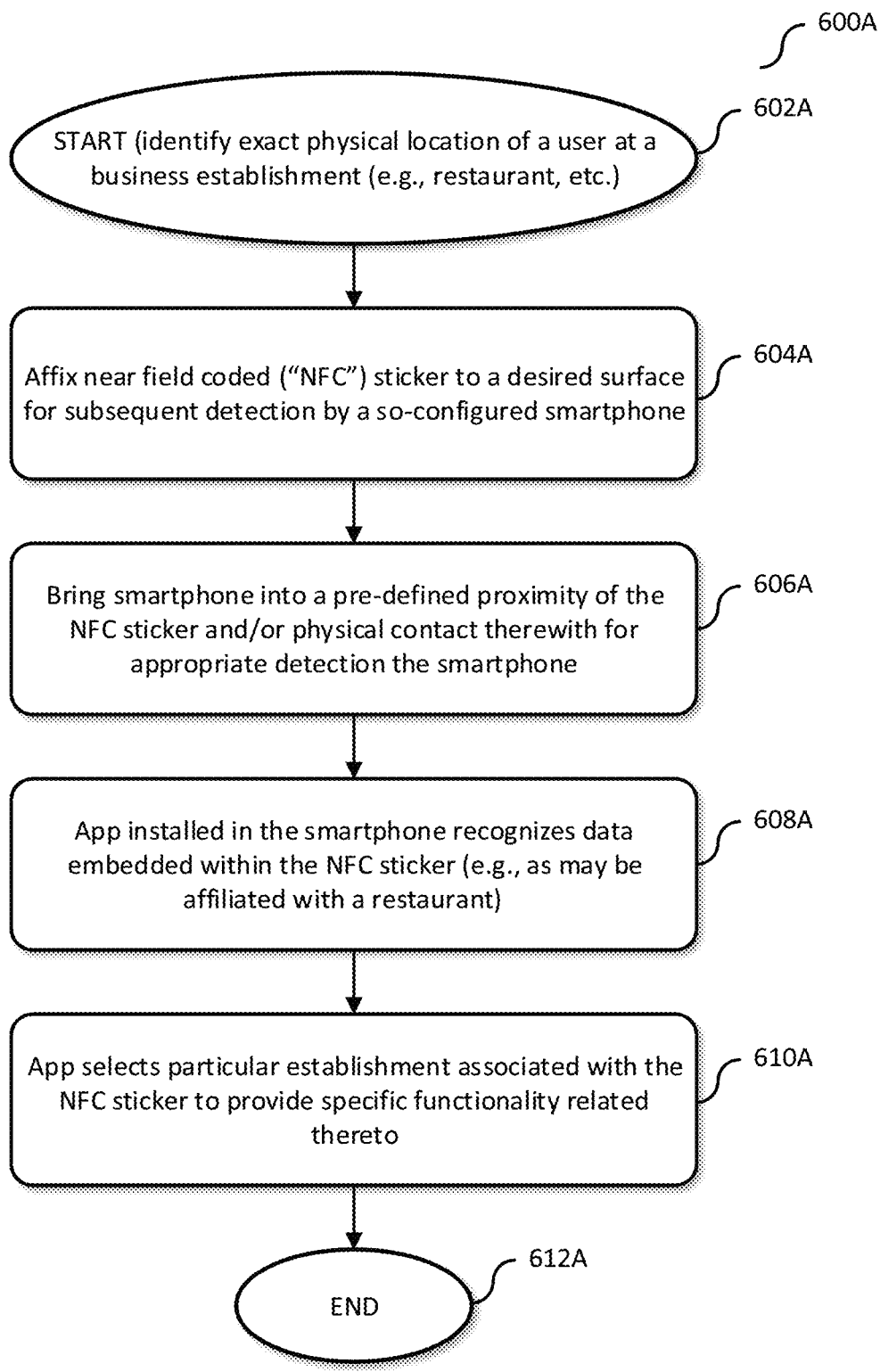
FIGS. 6A-6D illustrate an exemplary process flowcharts for various computer-software enabled customer service-related work-flow routines, in accordance with an embodiment of the present invention.
Figure 6B:
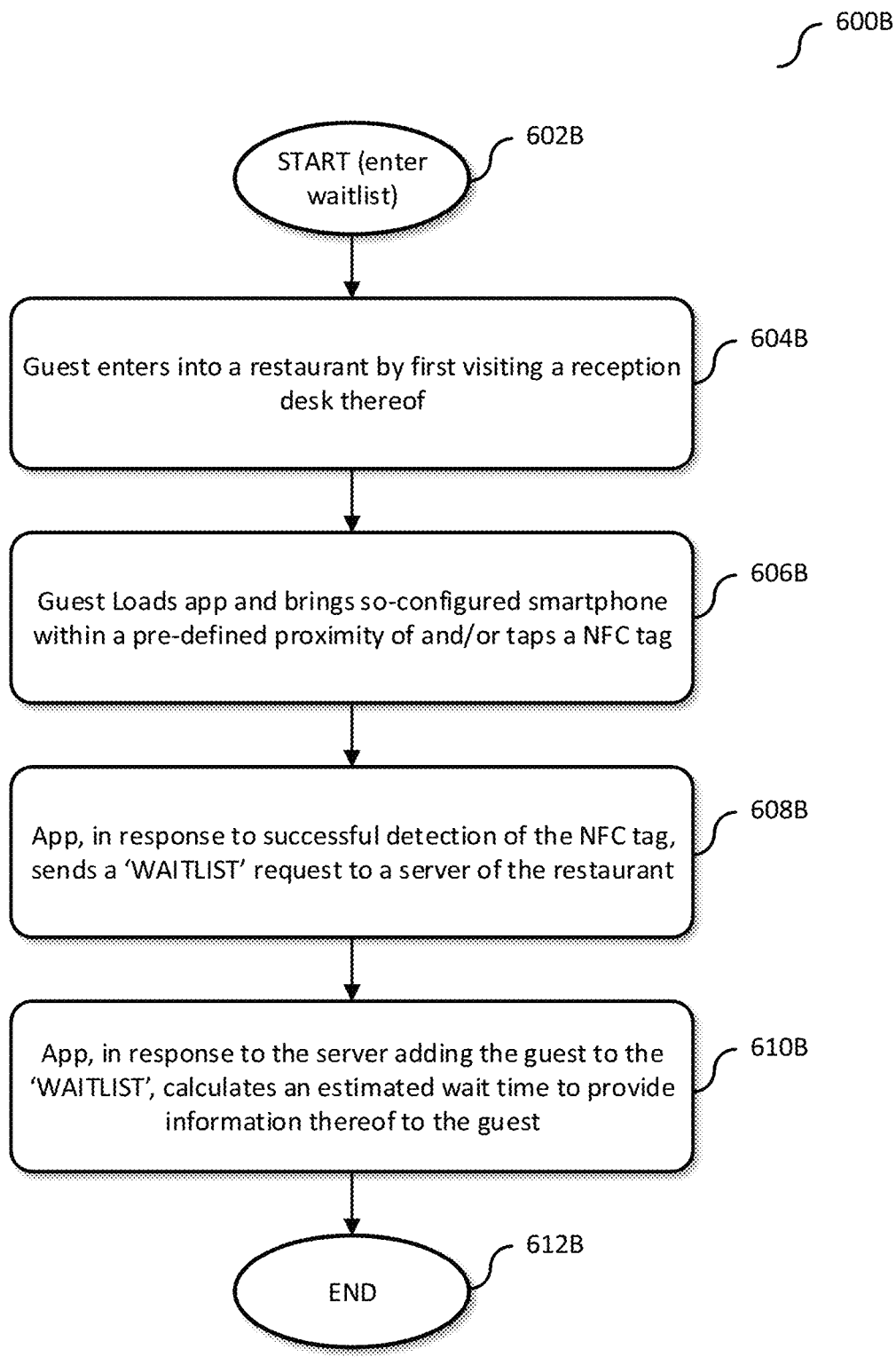
Figure 6C:
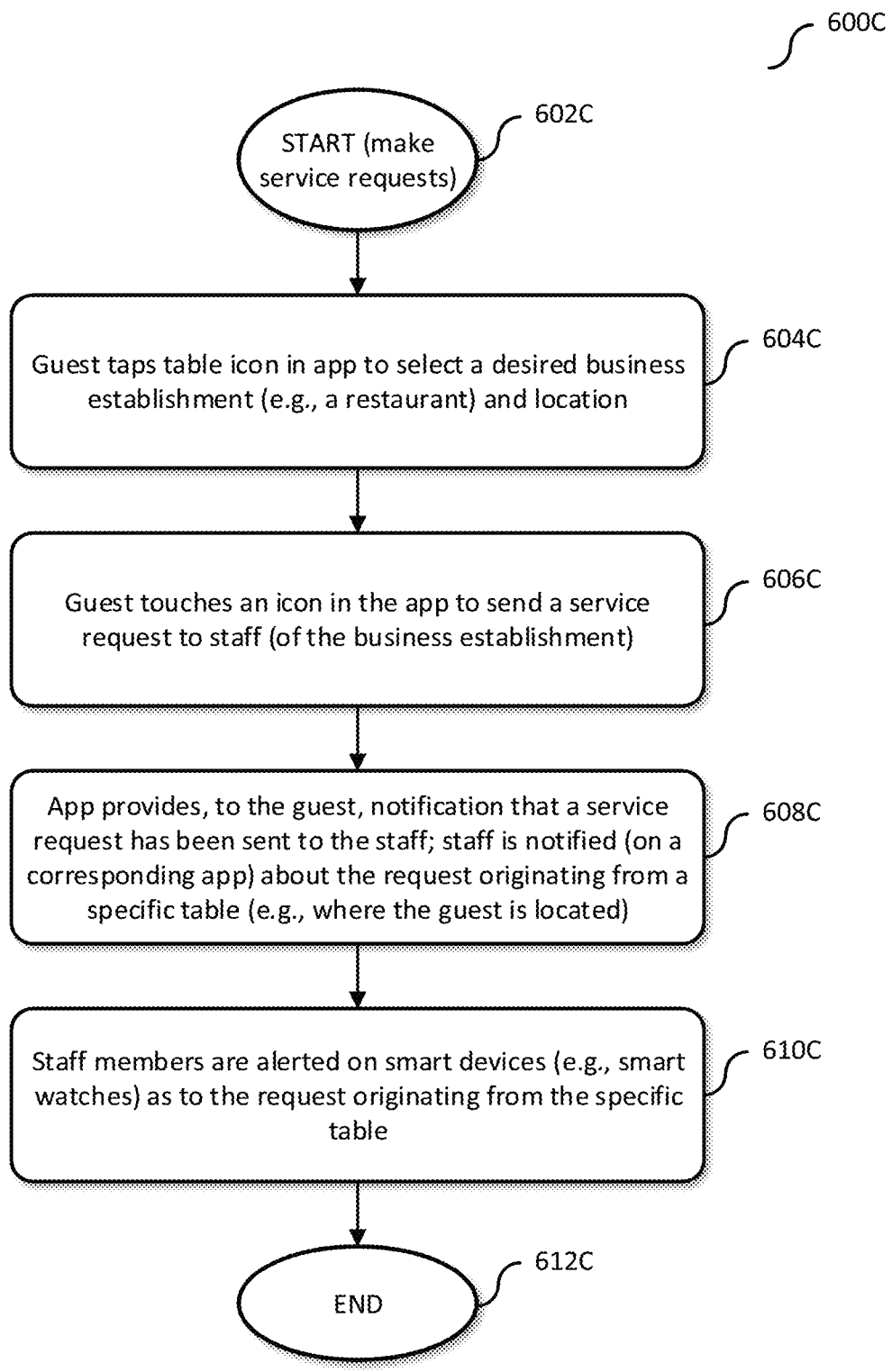
Figure 6D:
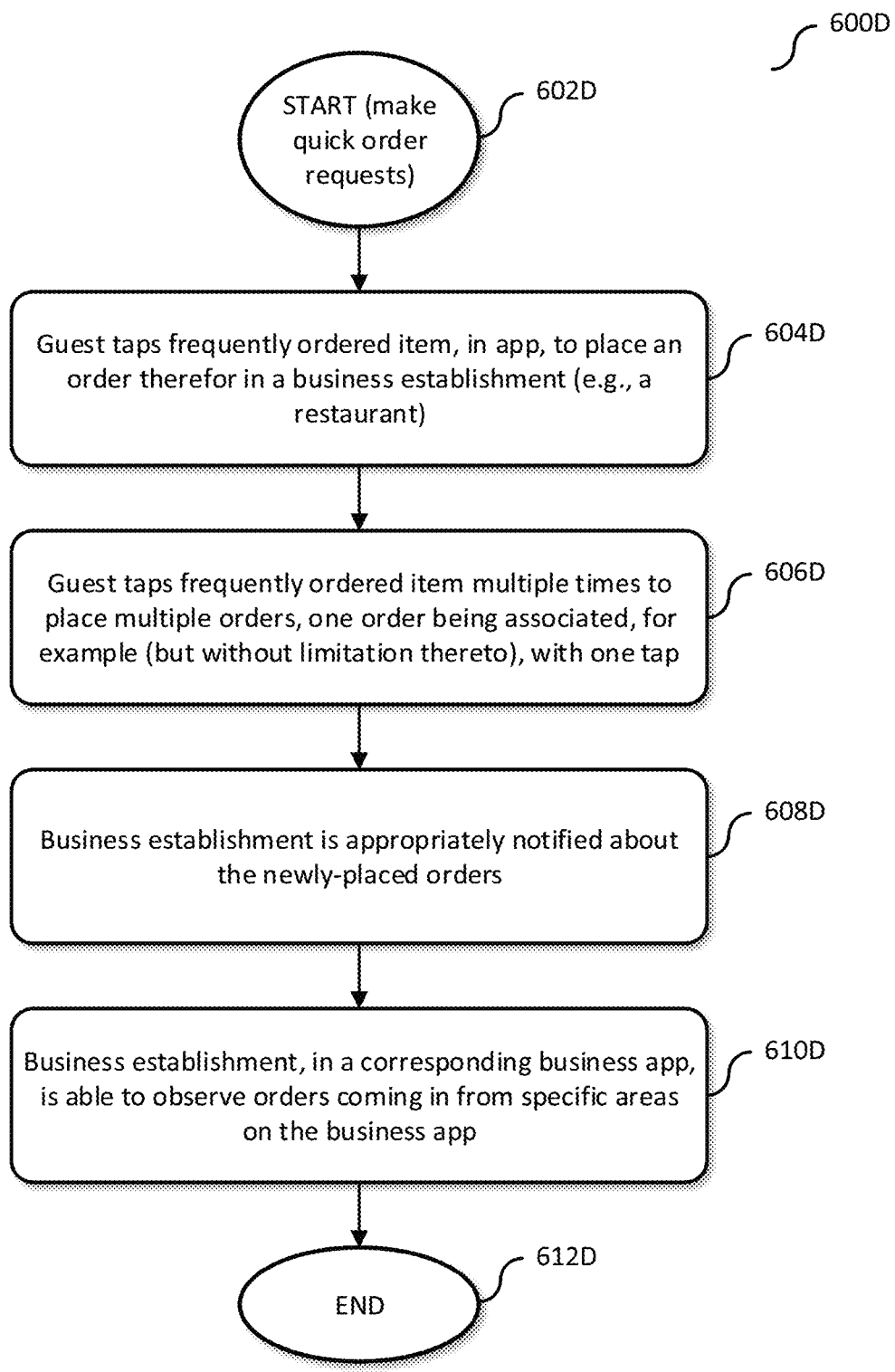

FIG. 5 illustrates an architecture of a system for receiving customer location and order related information and for cross-referencing that information with restaurant service capabilities to provide responsive customer service, in accordance with an embodiment of the present invention. In the present embodiment, a system architecture 500 is shown including, for example (but not limitation thereto): (1) a guest-focused system 502; and, (2) a restaurant-focused system 504. Each of the guest-focused system 502 and the restaurant-focused system 504 may electronically communicate with each other, e.g., wirelessly through existing means and other methods, to result in overall customer service provision efficiency enhancement.

Regarding the guest-focused system 502, guests may enter into a restaurant having the restaurant-focused system 504 installed therein with their respective smartphones 510, e.g., Apple® iPhones®; Samsung® Galaxy®, etc., to initiate interactivity and/or a touch-screen based session by downloading a smartphone-intended computer software-based application (e.g., an "application") from an Internet-based website 516 delivered via electronic passage 518 to smartphone 510, the application being a consumer-friendly and interactive form of the guest-focused system 502. In an embodiment, guests may "check-in" by a touch-screen based gesture 512 on the application of the guest-focused system 502. Completion of the gesture 512 may initiate the "check-in" sequence or process once the guest bring his or her smartphone 510 into a pre-defined proximity of a NFC tag as described earlier.

By way of example and not limitation, the guest-focused system 502 may be at least partially installed on the smartphone 510 to rely on computer-processor based machinery therein for functioning. The guest-focused system 502, in an embodiment, may include modules directed to permitting the guest to communicate interactively with the restaurant-focused system 504 through touch-screen sensitivity of the guest-focused system 502 installed as an application on the smartphone 510. Accordingly, in an embodiment, the guest-focused system 502 may include at least the following modules (but not be limited to that shown): a guest session module 522, a guest orders module 524, a guest requests module 526 and a waitlist maintenance module 528.

In operation, the guest session module 522 may be initiated upon touch-screen activation of the guest-focused system 502 installed as an application on the smartphone 510, where the guest may input guest orders via the guest orders module 524, e.g., related to desired food and drink items, and/or other orders, e.g., replacement silverware, etc. In one or more embodiments, guests may choose to make a reservation at the restaurant prior to their arrival and thus load the guest-focused system 502 at a location remote from the restaurant to communicate a reservation request thereto via traditional data communication channels, e.g., Wi-Fi and/or cellular-based technologies. Such a reservation request may be communicated via the waitlist maintenance module 528.

By way of example and not limitation, any one or more of the modules 522-528 may communicate sequentially, collectively, or in any order and/or configuration with a guest notification manager 548 responsible for aggregating guest requests and/or related demand information to communicate the same to a server database 506. Also, any one or more of the modules 522-528 may communicate sequentially, collectively, or in any order and/or configuration with any one or more of the particularized functionality modules 530-546 within the guest-focused system 502, inclusive of (but not limited to): a guest credentials module 530, a mobile IP address module 532, a geographic location module 534, a scanned tag ID module 536, a beacon ID module 538, a restaurant ID module 540, a restaurant table ID module 542, a restaurant chair ID module 544, and/or a restaurant section module 546.

Operationally, the guest credentials module 530 may include a name and/or a home address of a guest using the guest-focused system 502. The mobile IP address module 532 may include data and/or information specific to the smartphone 510 of a particular guest suitable for combination, filtration, separation, integration and/or re-integration, and/or any other data manipulation function to, for example (but not limitation thereto), validation of an authorized guest and/or to filter our invalid requests from smartphones and/or devices that not properly integrated with and/or otherwise authenticated by guest-focused system 502. Such guest authentication and/or validation capabilities made possible by the mobile IP address module 532 may, in an embodiment, be supplemented by geographic location module 534 that may rely on GPS-based technology to identify the location of a guest, e.g., prior to his or her arrival at the restaurant, and/or, in an embodiment, within the restaurant as well.

Like the other various modules discussed, the scanned ID module may integrate with other modules of the guest-focused system 502 to provide guest location related information upon the guest's "checking-in" to a particular location by scanning and/or tapping the smartphone 510 against a NFC tag. In one or more embodiments, such NFC tags may be pre-defined with data useful to restaurants, e.g., menu-specific and/or related information. Beacon ID module 538 may include Bluetooth® enable functionality to further supplement, integrate with, or replace any one or more of the guest location identification capabilities enumerated by NFC-tag based checking-in and/or GPS location, etc.

By way of example and not limitation, in one or more embodiments, any one or more of the modules may interact with the restaurant ID module 540, the restaurant table ID module 542, the restaurant chair ID module 544, and/or the restaurant section module 546 to accurately pin-point the location of the guest within the restaurant to, e.g., provide better, more competent, and more responsive service to his or her demands, ensuring a positive and optimal overall dining experience.

Reflective of the needs and/or the various functional demands and/or capabilities of the guest-focused system 502 as substantially set forth above, the restaurant-focused system 504 may include, by way of example and not limitation, at least the following modules: a restaurant session module 572, a restaurant orders module 574, a restaurant credentials module 576, a NFC tag IDs module 578, a restaurant section module 580, a restaurant POS session manager module 582, a restaurant POS menu manage 584, a restaurant guest request manager 586, and a restaurant waitlist manager 588. Any one or more of these modules may communicate interactively with and/or be visually displayed on a restaurant smart device, e.g., an Apple® iPad®, 562, which may download an application of the restaurant-focused system 504 from an Internet-based website 566, which may be in electronic association and/or communication with the restaurant-focused system 504 via electronic communicative extraction and/or passageway 568.

Operationally, restaurant management and/or wait staff may initiate the restaurant session to correspond with, for example (but not limitation thereto), a particular shift, e.g., lunch service, dinner service, evening cocktails, etc., to proceed to accept one or more guest-made guest requests via the guest requests module 526 that may be duly recorded in the restaurant orders module 574. Alternatively, the restaurant orders module 574 may correspond with the placement of restaurant-based orders for the replenishment of depleted supplies, inclusive of (but not limited to): foodstuffs and drinks, etc.

Any one or more of the restaurant credentials module 576, the NFC tag IDs module 578, and/or the restaurant section module 580 may receive corresponding guest location related data and/or information as provided by, for example the mobile IP address module 532, the geographic location module 534 and/or the scanned tag ID module 536 to provide better, more efficient, and more responsive service to the guest.

Upon completion of the guest's dining session at the restaurant, he or she may elect to pay for pending charges via engaging with the restaurant's point-of-sale or point-of-service ("POS") system, exemplified, in an embodiment, by any one or more of the restaurant POS session manager module 582, the restaurant POS menu manager 584, and/or the restaurant guest request manager 586. In an example payment process, the guest may initiate payment via corresponding touching of the smartphone 510 to direct guest-focused system 502 to communicate the guest request via the guest requests module 526 related to payment for communication of the same to the restaurant POS session manager module 582 for effective receipt and processing of payment therein.

Such communicative ability between each the guest-focused system 502 and the restaurant-focused system 504 may be at least in part dependent on common interconnectivity and shared communication means via a server database 506. By way of example and not limitation, the server database 506 may be at least partially implemented in computer hardware, including one or more servers with non-volatile memory storage mediums associated therewith. The server database 506, in an example embodiment, may include at least the following independent, but functionally interconnected, modules, without limitation thereto: a location database module 552, a guest settings module 554, a restaurant settings and profile module 556, a guest request notification message 558 a restaurant tag IDs module 590, and a restaurant orders module 592. Those skilled in the art will appreciate that the modules 552-592 are provided as an example and that the server 506 may be substantially practiced or operational without any one or more of the modules 552-592 and/or additional modules not shown in FIG. 5; moreover, modules 552-592 may be organized and/or configured in any order, including those different from that shown.

Operationally, the location database 552 may store various location characteristics, inclusive of: street addresses, P.O. boxes for shipping business-related information, headquarters for franchise restaurants, etc., for restaurants such that the location database 552 may be parsed through and/or searched for specific restaurants at least partially based on the guest "checking-in" to a particular location. For example (but not limitation thereto), a guest checking into a location of a national restaurant chain may provide region, city, and street address related information to the location database 552 which may, in response, provide particularized corresponding information to the guest relative to that specific location, e.g., food and drink specials, specific menu items available only at that particular restaurant location, etc.

Similarly, the guest settings module 554 may provide for particularized guest settings that may be stored for repeat guest visits to the same restaurant location, or different locations, such that the demands and preferences of the guest are consistently and efficiently always met. The guest settings module 554, in an embodiment, may communicate with the restaurant settings and profile module 556 which may store particularized information specific to the individual restaurant attended by the guest, inclusive of layout, available food items, so on and so forth.

The restaurant-focused system 504 may electronically forward and/or communicate data and/or information related to restaurant credentials module 576 and/or the like to restaurant tag IDs module 590; likewise, information collected and/or processed by the restaurant POS session manager module 582 and/or the like may be forwarded to the restaurant orders module 592, both for further processing. Accordingly, various individual restaurant locations, both of the restaurant and of individual customer seating locations within individual restaurants may be identified by the restaurant tag IDs module 590, where corresponding restaurant orders may be delivered to guests via the restaurant orders module 592. By way of example and not limitation, at least the restaurant tag IDs module 590 may communicate the guest request notification message 558 for a server-to-restaurant reverse communication 570 to the restaurant-focused system 504 for appropriate recognition and action by interested restaurant management and wait staff members upon viewing a corresponding display at the restaurant smart device 562 via bi-directional electronic and/or wireless communicative passageway 564. In one or more embodiments, the server database 506 may similarly communicate with the guest-focused system 502 via a server-to-guest reverse communication 598 for one or more action items related to of the modules 552-592 incorporated in the server database 506.

By way of example and not limitation, aggregated POS information related to customer payment for services rendered, or (in the alternative) non-payment by identified customers, patrons, and/or guests by a specified expected payment time, may be electronically communicated and/or forwarded to a POS vendor server at least partially installed on and/or otherwise affiliated with a cloud-based location 594. In an embodiment, the cloud-based location 594 may be off-site to one or more restaurants, thus able to provide distinguishing correspondence between restaurants and feedback to the restaurant-focused system 504 if and when necessary, e.g., to produce restaurant-particularized menus, etc. Moreover, the cloud-based location 504, housing and/or otherwise inclusive of one or more POS vendor servers as shown in FIG. 5, may forward and/or return order and/or payment related information to restaurants via process completion pathway 596, indicative of completion of the service and payment paradigm shown by system architecture 500.

FIGS. 6A-6D illustrate an exemplary process flowcharts for various computer-software enabled customer service-related work-flow routines, in accordance with an embodiment of the present invention. Those skilled in the art will appreciate that any one or more of routines shown in FIGS. 6A-6D may functionally integrate with any one or more systems and/or modules as shown in any other FIG. of the present disclosure without limitation. As shown in the present embodiment of a business establishment selection and smartphone coupling method 600A, a start operation 602A identifies the exact physical location of a user at a business establishment, e.g., a restaurant, using, for example (but not limitation thereto): GPS-based systems and/or functionality. A NFC-coded sticker may be affixed to a desired surface for subsequent detection by an appropriately configured smartphone or device of a business establishment customer, guest, patron and/or the like at a NFC-coded sticker fixation operation 604A. The patron's smartphone may be brought within a pre-defined proximity, at a bring-into proximity operation 606A, of the NFC stick and/or physical contact therewith for appropriate detection of the smartphone, and by association, the patron (e.g., the holder and/or owner of the smartphone now electronically tethered and/or coupled and/or identified by the NFC tag, etc.). An application installed in the smartphone may recognize particularized data embedded within the NFC tags/sticker, e.g., as may be affiliated with a particular restaurant, at a recognition operation 608A to select the particular restaurant establishment at a selection operation 610A. The business establishment selection and smartphone coupling method 600A may then conclude at an end operation 612A.

As shown in the present embodiment of a waitlist entrance method 600B, a guest, patron, and/or customer may enter a waitlist for service at a business establishment, e.g., a restaurant, by a start operation 602B (e.g., commensurate with the touch-screen sensitivity of activating a relevant portion of a so-equipped application installed on a customer smartphone, etc.). The guest, in the waitlist entrance method 600B, may load an application (e.g., substantially as described elsewhere by the disclosed embodiments) to visit a reception desk at a visit operation 604B to bring his or her smartphone, with the application loaded, to tap against an NFC tag at a host NFC tag check-in operation 606B to add the guest's name to a waitlist. The application, in response to successful detection of the NFC tag, sends a request entitled "WAITLIST" to a corresponding server of the restaurant at a send operation 608B. The application, in response to the server adding the guest to the "WAITLIST", calculates an estimated wait time to provide information representative thereof to the guest at an estimated wait time communication operation 610B prior to conclusion of the waitlist entrance method 600B at an end operation 612B.

As shown in the present embodiment of a guest service request to business staff method 600C, a guest, patron, and/or customer may enter a waitlist for service at a business establishment, e.g., a restaurant, by a start operation 602C (e.g., commensurate with the touch-screen sensitivity of activating a relevant portion of a so-equipped application installed on a guest smartphone, etc.). The guest may tap a NFC tag to establish wireless communication between a smartphone or device of the guest to select a desired business establishment and location at a business selection operation 604C. The guest may touch an icon in the application to send a service-related request, e.g., related to ordering food and/or drink items, to staff at a service request send operation 606C. the application may provide, to the guest, notification the service request has been successfully sent to the staff such that the staff is notified on a corresponding business application about the request originating from a specific table, e.g., where the guest is located, at a notification of service request sent operation 608C. Staff members are alerted on staff smart deice, e.g., smart watches, as to the request originating at a specific table at an alert operation 610C prior to conclusion of the business staff method 600C at an end operation 612C.

As shown in the present embodiment of a quick-order method 600D, a guest, patron, and/or customer may enter a waitlist for service at a business establishment, e.g., a restaurant, by a start operation 602D (e.g., commensurate with the touch-screen sensitivity of activating a relevant portion of a so-equipped application installed on a guest smartphone, etc.). The guest may tap a frequently ordered item, in the application, to place an additional order therefor in a business establishment at a repeat order operation 604D; notably, the guest may tap a frequently ordered item multiple times to commensurately increase the number of ordered items in a scale-up operation 606D, e.g., such that three (3) consecutive taps equates to the order of three (3) of the same item, etc. The business establishment is appropriately notified as to the newly-placed repeat orders in a repeat order notification operation 608D such that the business establishment, in a corresponding business application, observing orders incoming from specific physical areas, at an observe orders operation 610D, in the business establishment in their corresponding business application. The quick-order method 600D may then conclude at an end operation 612D.

FIGS. 7A-7D illustrate various corresponding schematic diagrams and/or graphical representations of elements presented in the process flowcharts of FIGS. 6A-6D. Those skilled in the art will appreciate that the schematic diagrams and/or graphical representations shown in FIGS. 7A-7D are provided as an example and that other suitable variations may exist without departing from the scope and spirit of the disclosed embodiments. As shown in the present embodiments, NFC-tag check-in representation 700A includes a NFC-equipped tag and/or sticker 704A placed on an exposed surface, e.g., a table-top, 702A for appropriate reading and/or coupling of a smartphone and/or device 706A brought within a pre-defined proximity of the NFC-equipped tag and/or sticker 704A, a process referred to herein as "tapping". In one or more embodiments, the smartphone and/or device 706A may be actually physically contacted against the NFC-equipped sticker 704A to effectuate wireless coupling therewith. Such a process, involving physical contact or merely close proximity, may be referred to collectively as "tapping", consistent with other embodiments as so described herein.

The smartphone and/or device 706A, after being successfully "tapped" with the NFC-equipped tag and/or sticker 704A, may provide touch-screen sensitivity as shown by a touch-screen 714A. Contact of an input means 712A, e.g., a human finger and/or thumb, produces a commensurate notification 716A displayable on an active screen 710A, which may be inclusive of a display of a table identification icon 708A and a place-order icon 718A, of an application as disclosed by one or more other embodiments presented herein.

As shown in the present embodiments, various application screenshots 700B may include at least the following app-related active screens, without limitation thereto: (1) a log-in screen 702B; (2) a ready-to-scan NFC-tapping screen 704B; (3) an enter waitlist screen 706B; and, (4) a restaurant-application based incoming data management screen 710B.

The log-in screen 702B may be representative of a customer launching a customer application, consistent with any one or more of the other embodiments, disclosed herein, allowing for various distinct but potentially interrelated options and/or functionality, including (but not limited thereto): (1) scanning of a QR code; (2) scanning of an NFC tag; and, (3) selection of restaurants from a nearby list.

Figure 7A:
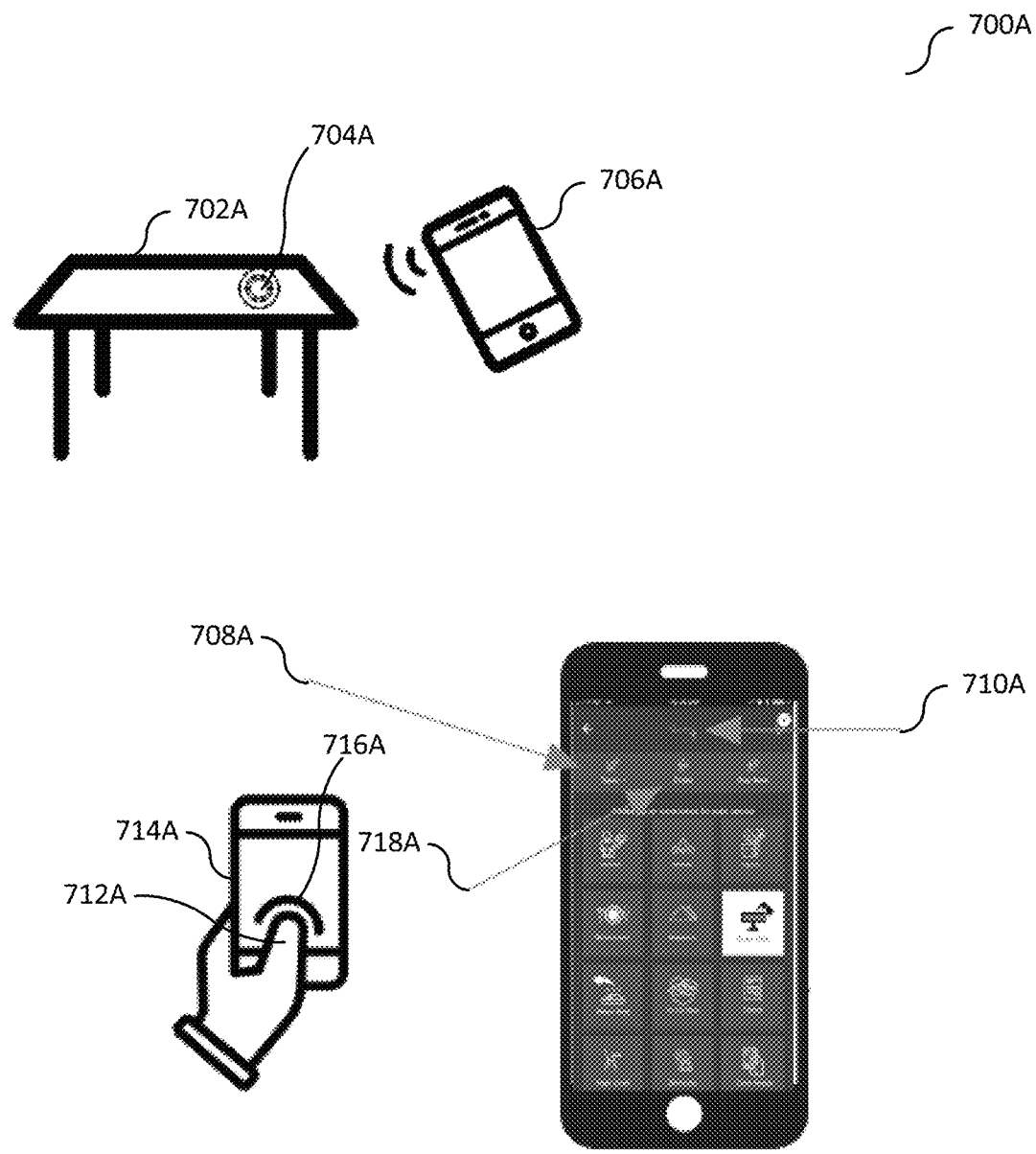
FIGS. 7A-7D illustrate various corresponding graphical representations of elements presented in the process flowcharts of FIGS. 6A-6D.
Figure 7B:
Figure 7C:
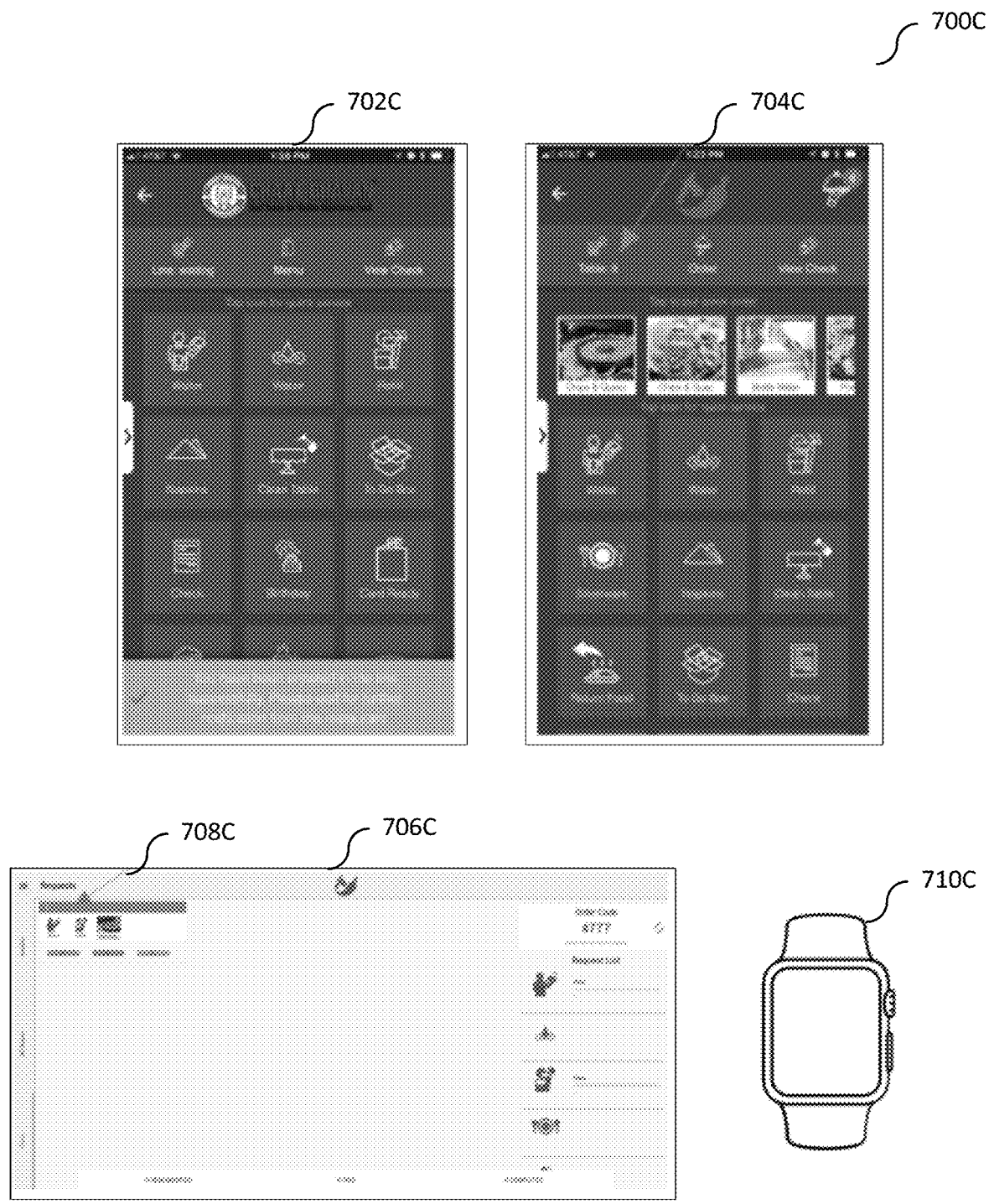
Figure 7D:
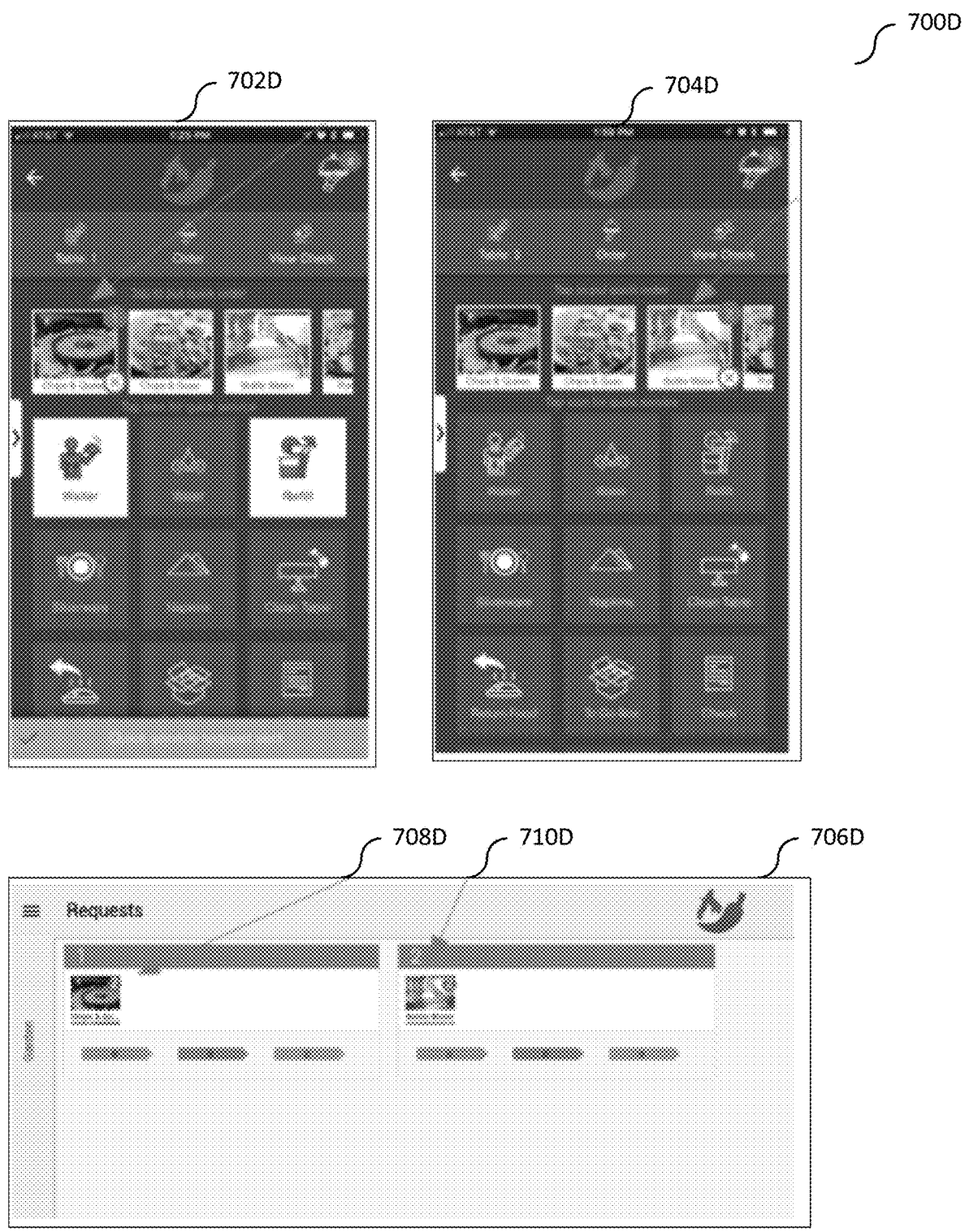

The ready to scan NFC-tapping screen 704B permits the customer to hold his or her phone near a prepared NFC tag and/or sticker, at least substantially as described in other embodiments and/or by the NFC-equipped tag and/or sticker 704A shown and discussed in connection with FIG. 7A, to establish a connection therewith and thus with, for example (but not limitation thereto), the guest-focused system 502 and/or restaurant-focused system 504 as substantially discussed in connection with FIG. 5.

Alternatively, and/or in addition to checking-in as so described, a customer may add himself or herself to a waitlist at a restaurant by tapping a NFC tag as substantially described by waitlist entrance method 600B shown and discussed in connection with FIG. 6, or otherwise.

The restaurant-application based incoming data management screen 710B displays information indicative of any one or more of the customer-originated actions shown in 702B-706B and/or may also be communicative, by display and/or sound and/or other interactive methodology, of any one or more functional aspects related to system architecture 500 shown and discussed with connection to FIG. 5.

As shown in the present embodiments, additional application screen shots 700C show various options for food and drink ordering and/or other related services, including payment, at a general screen 702C. A numerical identification, e.g., "9" may be shown to the customer relative to his or her location in the restaurant in progress screen 704C, where such customer-originated demand and/or request data and or information may be communicated to business establishment staff and displayed on a business application progress screen 706C, with specific real-time updated data and/or information 708C. In an embodiment, the business application progress screen 706C may be re-formatted to fit and/or otherwise be displayed on a smartwatch screen 710C.

As shown in the present embodiments, additional application screen shots 700D show the active selections of a customer, e.g., upon depression and/or contact of a touch-screen at the shown areas and/or regions, including a waiter refill request 702D and a bottle water request 704D, both of which may be communicated and displayed on a business application progress screen 706D, which may have separate indications 708D and 710D, respectively, for each request 702D and 704D.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like.

For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C, or Java, Brew or any other suitable programming language. The programs may be resident on a storage medium, e.g., magnetic or optical, e.g., without limitation, the computer hard drive, a removable disk or media such as, without limitation, a memory stick or SD media, or other removable medium. The programs may also be run over a network, for example, with a server or other machine sending signals to the local machine, which allows the local machine to carry out the operations described herein.

Functional Integration of System with Example Client/Server Systems

Figure 8:
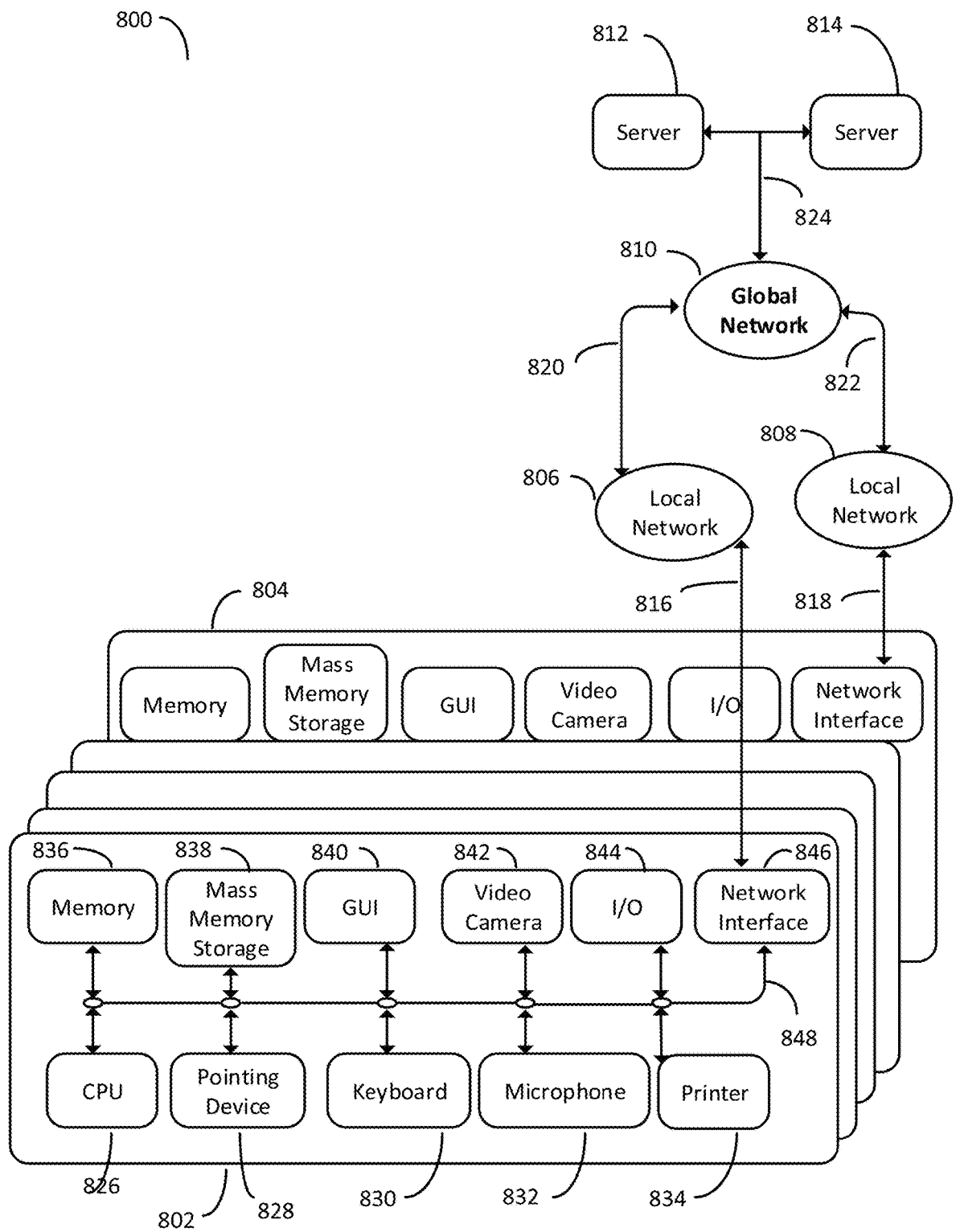
FIG. 8 illustrates a block diagram depicting an exemplary client/server system which may be used by an exemplary web-enabled/networked embodiment of the present invention.

FIG. 8 illustrates a block diagram depicting an exemplary client/server system which may be used by an exemplary web-enabled/networked embodiment of the present invention. A communication system 800 includes a multiplicity of clients with a sampling of clients denoted as a client 802 and a client 804, a multiplicity of local networks with a sampling of networks denoted as a local network 806 and a local network 808, a global network 810 and a multiplicity of servers with a sampling of servers denoted as a server 812 and a server 814.

Client 802 may communicate bi-directionally with local network 806 via a communication channel 816. Client 804 may communicate bi-directionally with local network 808 via a communication channel 818. Local network 806 may communicate bi-directionally with global network 810 via a communication channel 820. Local network 808 may communicate bi-directionally with global network 810 via a communication channel 822. Global network 810 may communicate bi-directionally with server 812 and server 814 via a communication channel 824. Server 812 and server 814 may communicate bi-directionally with each other via a communication channel 824. Furthermore, clients 802, 804, local networks 806, 808, global network 810 and servers 812, 814 may each communicate bi-directionally with each other.

In one embodiment, global network 810 may operate as the Internet. It will be understood by those skilled in the art that communication system 800 may take many different forms. Non-limiting examples of forms for communication system 800 include local area networks (LANs), wide area networks (WANs), wired telephone networks, wireless networks, or any other network supporting data communication between respective entities.

Clients 802 and 804 may take many different forms. Non-limiting examples of clients 802 and 804 include personal computers, personal digital assistants (PDAs), cellular phones and smartphones. Client 802 includes a CPU 826, a pointing device 828, a keyboard 830, a microphone 832, a printer 834, a memory 836, a mass memory storage 838, a GUI 840, a video camera 842, an input/output interface 844 and a network interface 846.

CPU 826, pointing device 828, keyboard 830, microphone 832, printer 834, memory 836, mass memory storage 838, GUI 840, video camera 842, input/output interface 844 and network interface 86 may communicate in a unidirectional manner or a bi-directional manner with each other via a communication channel 848. Communication channel 848 may be configured as a single communication channel or a multiplicity of communication channels.

CPU 826 may be comprised of a single processor or multiple processors. CPU 826 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 836 is used typically to transfer data and instructions to CPU 826 in a bi-directional manner. Memory 836, as discussed previously, may include any suitable computer-readable media, intended for data storage, such as those described above excluding any wired or wireless transmissions unless specifically noted. Mass memory storage 838 may also be coupled bi-directionally to CPU 826 and provides additional data storage capacity and may include any of the computer-readable media described above. Mass memory storage 838 may be used to store programs, data and the like and is typically a secondary storage medium such as a hard disk. It will be appreciated that the information retained within mass memory storage 838, may, in appropriate cases, be incorporated in standard fashion as part of memory 836 as virtual memory.

CPU 826 may be coupled to GUI 840. GUI 840 enables a user to view the operation of computer operating system and software. CPU 826 may be coupled to pointing device 828. Non-limiting examples of pointing device 828 include computer mouse, trackball and touchpad. Pointing device 828 enables a user with the capability to maneuver a computer cursor about the viewing area of GUI 840 and select areas or features in the viewing area of GUI 840. CPU 826 may be coupled to keyboard 830. Keyboard 830 enables a user with the capability to input alphanumeric textual information to CPU8 826. CPU 826 may be coupled to microphone 832. Microphone 832 enables audio produced by a user to be recorded, processed and communicated by CPU 826. CPU 826 may be connected to printer 834. Printer 834 enables a user with the capability to print information to a sheet of paper. CPU 826 may be connected to video camera 842. Video camera 842 enables video produced or captured by user to be recorded, processed and communicated by CPU 826.

CPU 826 may also be coupled to input/output interface 844 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 826 optionally may be coupled to network interface 846 which enables communication with an external device such as a database or a computer or telecommunications or internet network using an external connection shown generally as communication channel 816, which may be implemented as a hardwired or wireless communications link using suitable conventional technologies. With such a connection, CPU 826 might receive information from the network, or might output information to a network in the course of performing the method steps described in the teachings of the present invention.

Figure 9:
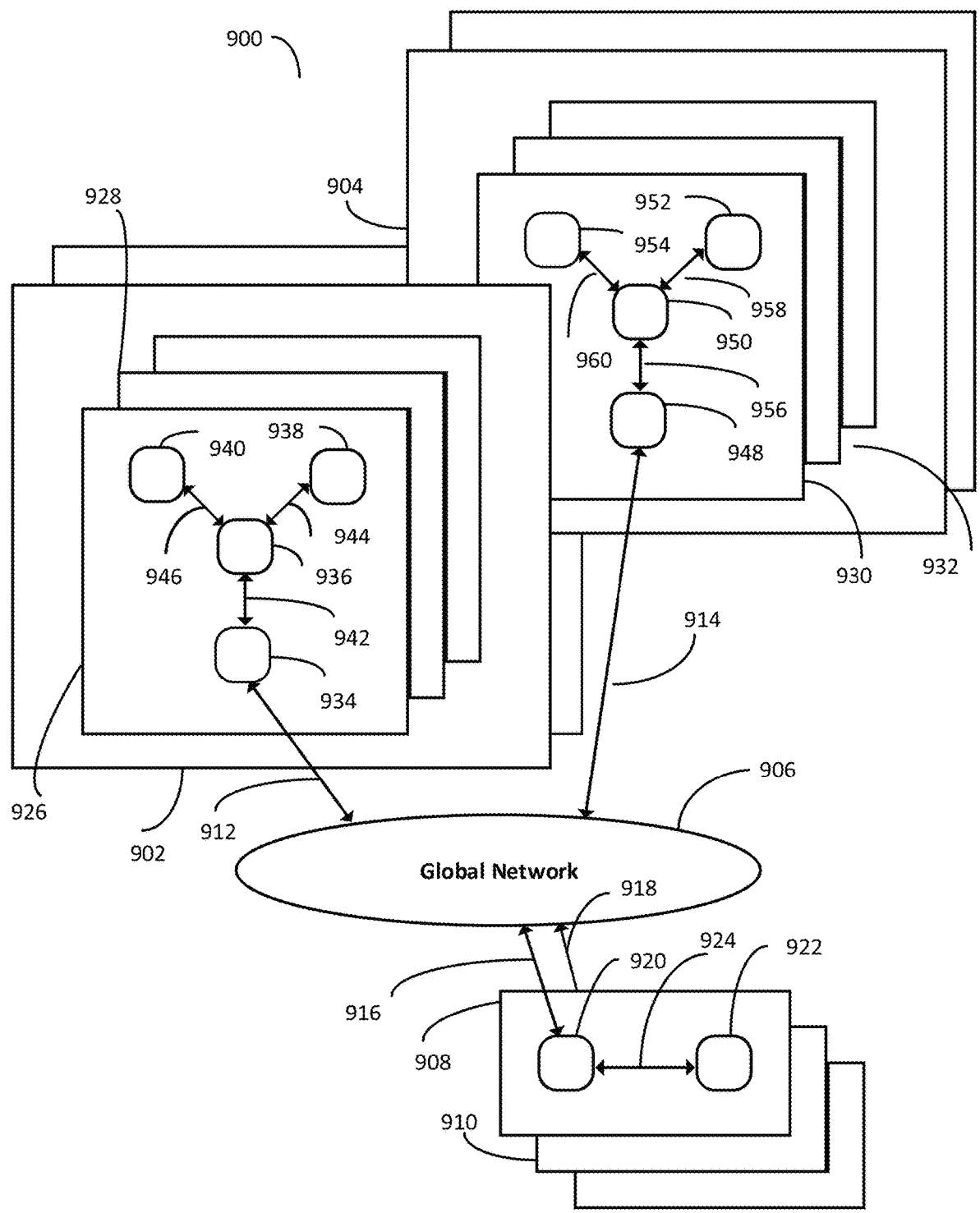
FIG. 9 illustrates a block diagram depicting a conventional client/server communication system, which may be used by an exemplary web-enabled/networked embodiment of the present invention.

FIG. 9 illustrates a block diagram depicting a conventional client/server communication system, which may be used by an exemplary web-enabled/networked embodiment of the present invention. A communication system 900 includes a multiplicity of networked regions with a sampling of regions denoted as a network region 902 and a network region 904, a global network 906 and a multiplicity of servers with a sampling of servers denoted as a server device 908 and a server device 910.

Network region 902 and network region 904 may operate to represent a network contained within a geographical area or region. Non-limiting examples of representations for the geographical areas for the networked regions may include postal zip codes, telephone area codes, states, counties, cities and countries. Elements within network region 902 and 904 may operate to communicate with external elements within other networked regions or within elements contained within the same network region.

In some implementations, global network 906 may operate as the Internet. It will be understood by those skilled in the art that communication system 900 may take many different forms. Non-limiting examples of forms for communication system 900 include local area networks (LANs), wide area networks (WANs), wired telephone networks, cellular telephone networks or any other network supporting data communication between respective entities via hard-wired or wireless communication networks. Global network 906 may operate to transfer information between the various networked elements.

Server device 908 and server device 910 may operate to execute software instructions, store information, support database operations and communicate with other networked elements. Non-limiting examples of software and scripting languages which may be executed on server device 908 and server device 910 include C, C++, C# and Java.

Network region 902 may operate to communicate bi-directionally with global network 906 via a communication channel 912. Network region 904 may operate to communicate bi-directionally with global network 906 via a communication channel 914. Server device 908 may operate to communicate bi-directionally with global network 906 via a communication channel 916. Server device 910 may operate to communicate bi-directionally with global network 906 via a communication channel 918. Network region 902 and 904, global network 906 and server devices 908 and 910 may operate to communicate with each other and with every other networked device located within communication system 900.

Server device 908 includes a networking device 920 and a server 922. Networking device 920 may operate to communicate bi-directionally with global network 906 via communication channel 916 and with server 922 via a communication channel 924. Server 922 may operate to execute software instructions and store information.

Network region 902 includes a multiplicity of clients with a sampling denoted as a client 926 and a client 928. Client 926 includes a networking device 934, a processor 936, a GUI 938 and an interface device 940. Non-limiting examples of devices for GUI 938 include monitors, televisions, cellular telephones, smartphones and PDAs (Personal Digital Assistants). Non-limiting examples of interface device 940 include pointing device, mouse, trackball, scanner and printer. Networking device 934 may communicate bi-directionally with global network 906 via communication channel 912 and with processor 936 via a communication channel 942. GUI 938 may receive information from processor 936 via a communication channel 944 for presentation to a user for viewing. Interface device 940 may operate to send control information to processor 936 and to receive information from processor 936 via a communication channel 946. Network region 904 includes a multiplicity of clients with a sampling denoted as a client 930 and a client 932. Client 930 includes a networking device 948, a processor 950, a GUI 952 and an interface device 954. Non-limiting examples of devices for GUI 938 include monitors, televisions, cellular telephones, smartphones and PDAs (Personal Digital Assistants). Non-limiting examples of interface device 940 include pointing devices, mousse, trackballs, scanners and printers. Networking device 948 may communicate bi-directionally with global network 906 via communication channel 914 and with processor 950 via a communication channel 956. GUI 952 may receive information from processor 950 via a communication channel 958 for presentation to a user for viewing. Interface device 954 may operate to send control information to processor 950 and to receive information from processor 950 via a communication channel 960.

For example, consider the case where a user interfacing with client 926 may want to execute a networked application. A user may enter the IP (Internet Protocol) address for the networked application using interface device 940. The IP address information may be communicated to processor 936 via communication channel 946. Processor 936 may then communicate the IP address information to networking device 934 via communication channel 942. Networking device 934 may then communicate the IP address information to global network 906 via communication channel 912. Global network 906 may then communicate the IP address information to networking device 920 of server device 908 via communication channel 916. Networking device 920 may then communicate the IP address information to server 922 via communication channel 924. Server 922 may receive the IP address information and after processing the IP address information may communicate return information to networking device 920 via communication channel 924. Networking device 920 may communicate the return information to global network 906 via communication channel 916. Global network 906 may communicate the return information to networking device 934 via communication channel 912. Networking device 934 may communicate the return information to processor 936 via communication channel 942. Processor 976 may communicate the return information to GUI 978 via communication channel 944. User may then view the return information on GUI 938.

Practice of System Method Steps and/or Components Outside of the United States

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention.

Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6)/(f) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6)

pre-AIA or 35 USC § 112 (f) post AIA. In some embodiments, the methods and/or system components which may be located and/or performed remotely include, without limitation: any one or more of functional operations and/or system modules related to acquisition of customer order-related input data and/or business establishment correspondence with customer-input data and the processing thereof other than, for example (but without limitation thereto): the actual physical entry of customer demands, which may be conducted on-site by the customer as associated with "checking-in" by "tapping" an NFC tag and/or sticker, etc. This on-site customer-originated data entry may be performed in-person by live human customers at brick-and-mortar business establishments located in the USA.

It is noted that according to USA law, all claims must be set forth as a coherent, cooperating set of limitations that work in functional combination to achieve a useful result as a whole. Accordingly, for any claim having functional limitations interpreted under 35 USC § 112 (6)/(f) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6)/(f) is/(are) dependent on one or more remote servers located outside the USA, it is intended that each such recited function under 35 USC § 112 (6)/(f) is to be interpreted as the function of the local system receiving the remotely generated information required by a locally implemented claim limitation, wherein the structures and or steps which enable, and breathe life into the expression of such functions claimed under 35 USC § 112 (6)/(f) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present patent application, and "35 USC § 112 (6)/(f)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims.

Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed.

Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant (s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a system and method of use thereof for improving service provider efficiency in providing service responsive to the request of a customer through implementation of smartphone (or device) based wireless technology according to the present invention will be apparent to those skilled in the art. Various aspects of the invention have been described above by way of illustration, and the specific embodiments disclosed are not intended to limit the invention to the particular forms disclosed. The particular implementation of a system and method of use thereof for improving service provider efficiency in providing service responsive to the request of a customer through implementation of smartphone (or device) based wireless technology may vary depending upon the particular context or application. By way of example, and not limitation, the system and method of use thereof for improving service provider efficiency described in the foregoing embodiments may have been discussed and directed to implementations in a restaurant; however, similar systems, modules, techniques, and/or methods of use thereof may instead be implemented in, for example (but not limitation thereto): retail stores, gaming establishments, go-kart tracks, shopping malls, vacation resorts, hotels, motels casinos, hospitals, movie theaters, and/or any venue where a customer who enters a business establishment seeking assistance and/or service responsive to his or her needs, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A patron service method, comprising the steps of:
   receiving a near-field communication ("NFC") tag identifier (ID) associated with an establishment obtain by scanning an NFC tag at a location in the establishment using a wireless device of a patron;
   receiving login credentials associated with the patron and the wireless device, wherein the step of receiving the login credentials comprises step of receiving a user ID associated with the patron, a password for authenticating use of a server by an application operating on the wireless device, a geo-location associated with the wireless device, a phone Internet Protocol (IP) address, an ID identifying the establishment, a table number where the patron is located, and a chair number where the patron is located; and
   determining from the login credentials associated with the patron and the wireless device, and from the NFC tag ID a location of the patron in the establishment.

2. The method as recited in claim 1, further comprising the step of communicating to the wireless device of the patron an available service of the establishment based on the login credentials associated with the patron and the wireless device, and from the NFC tag ID.

3. The method as recited in claim 1, in which the establishment comprises a restaurant, and in which the step of communicating the available service comprises the step of communicating one selected from a menu presenting items to order and a service request icon selectable to request a service from a wait staff.

4. The method as recited in claim 1, further comprising the step of communicating a modification to an available service, the step of communicating the available service comprises step of communicating at least one selected from determining icons to display, display of available actions, display of offered menus, food or drinks ordering functions, display of menu images, bill payment, bill splitting, partial bill payment, display of current check total, order modifications, identification of daily menu items, business branding information, offered quick services, quick add-on order items, and establishment recommendations.

5. The method as recited in claim 4, in which the step of communicating the modification to the available service comprises the step of synchronizing updates and changes made in the restaurant POS system directly into wireless device of the patron.

6. The method as recited in claim 1, further comprising the step of associating the identified location with exact order items in the system for later reference for the service staff to keep track of an order made by the patron to enhance the customer experience.

7. A patron service system, comprising:
   a business information collection module configured to receive a near-field communication ("NFC") tag identifier (ID) associated with an establishment obtain by scanning an NFC tag at a location in the establishment using a wireless device of a patron;
   a guest information collection module configured to receive login credentials associated with the patron and the wireless device, wherein the guest information collection module is further configured to receive a user ID associated with the patron, a password for authenticating use of a server by an application operating on the wireless device, a geo-location associated with the wireless device, a phone Internet Protocol (IP) address, an ID identifying the establishment, a table number where the patron is located, and a chair number where the patron is located; and
   an information verification module configured to determine from the login credentials associated with the patron and the wireless device, and from the NFC tag ID, a location of the patron in the establishment.

8. The patron service system as recited in claim 7, further comprising a wireless communication sending module configured to communicate to the wireless device of the patron an available service of the establishment based on the login credentials associated with the patron and the wireless device, and from the NFC tag ID.

9. The patron service system as recited in claim 7, in which the establishment comprises a restaurant, and in which the wireless communication sending module communicating communicates an available service one selected from a menu presenting items to order and a service request icon selectable to request a service from a wait staff.

10. The patron service system as recited in claim 7, further comprising a wireless communication sending module configured to communicate a modification to an available service, the modification to the available service comprises communicating at least one selected from determining icons to display, a display of available actions, a display of offered menus, food or drinks ordering functions, a display of menu images, bill payment, bill splitting, partial bill payment, a display of current check total, order modifications, identification of daily menu items, business branding information, offered quick services, quick add-on order items, and establishment recommendations.

11. The patron service system as recited in claim 10, in which the wireless communication sending module is configured to communicate the modification to the available service by synchronizing updates and changes that are made in the restaurant POS system directly into wireless device of the patron.

12. The patron service system as recited in claim 7, further comprising an information processing, formatting, and organizing module configured to associate the identified location with exact order items in the system for later reference for the service staff to keep track of an order made by the patron to enhance the customer experience.

13. A non-transitory computer-readable storage medium with an executable program stored thereon, wherein the program instructs one or more processors to perform the following steps:
  receiving a near-field communication ("NFC") tag identifier (ID) associated with an establishment obtain by scanning an NFC tag at a location in the establishment using a wireless device of a patron;
  receiving login credentials associated with the patron and the wireless device, in which the receiving the login credentials comprises receiving a user ID associated with the patron, a password for authenticating use of a server by an application operating on the wireless device, a geo-location associated with the wireless device, a phone Internet Protocol (IP) address, an ID identifying the establishment, a table number where the patron is located, and a chair number where the patron is located; and
  determining from the login credentials associated with the patron and the wireless device, and from the NFC tag ID a location of the patron in the establishment.

14. The program instructing the one or more processors as recited in claim 13, further comprising communicating to the wireless device of the patron an available service of the establishment based on the login credentials associated with the patron and the wireless device, and from the NFC tag ID and associating the identified location with exact order items in the system for later reference for the service staff to keep track of an order made by the patron to enhance the customer experience.

15. The program instructing the one or more processors as recited in claim 13, in which the establishment comprises a restaurant, and in which the communicating the available service comprises communicating one selected from a menu presenting items to order and a service request icon selectable to request a service from a wait staff.

16. The program instructing the one or more processors as recited in claim 13, further comprising communicating a modification to an available service, the communicating the available service comprises communicating at least one selected from determining icons to display, display of available actions, display of offered menus, food or drinks ordering functions, display of menu images, bill payment, bill splitting, partial bill payment, display of current check total, order modifications, identification of daily menu items, business branding information, offered quick services, quick add-on order items, and establishment recommendations.

17. The program instructing the one or more processors as recited in claim 16, in which the communicating the modification to the available service comprises synchronizing updates and changes made in the restaurant POS system directly into wireless device of the patron.

18. A patron service method, the method comprising:
  steps for receiving a near-field communication ("NFC") tag identifier (ID) associated with an establishment obtain by scanning an NFC tag at a location in the establishment using a wireless device of a patron;
  steps for receiving login credentials associated with the patron and the wireless device wherein the steps for receiving the login credentials comprise steps for receiving a user ID associated with the patron, a password for authenticating use of a server by an application operating on the wireless device, a geo-location associated with the wireless device, a phone Internet Protocol (IP) address, an ID identifying the establishment, a table number where the patron is located, and a chair number where the patron is located; and
  steps for determining from the login credentials associated with the patron and the wireless device, and from the NFC tag ID a location of the patron in the establishment.

* * * * *